May 22, 1956  G. E. SLEEPER, JR., ET AL  2,747,013
POLYCHROME TELEVISON WITH COLOR SHIFT
Filed March 14, 1950  7 Sheets-Sheet 1
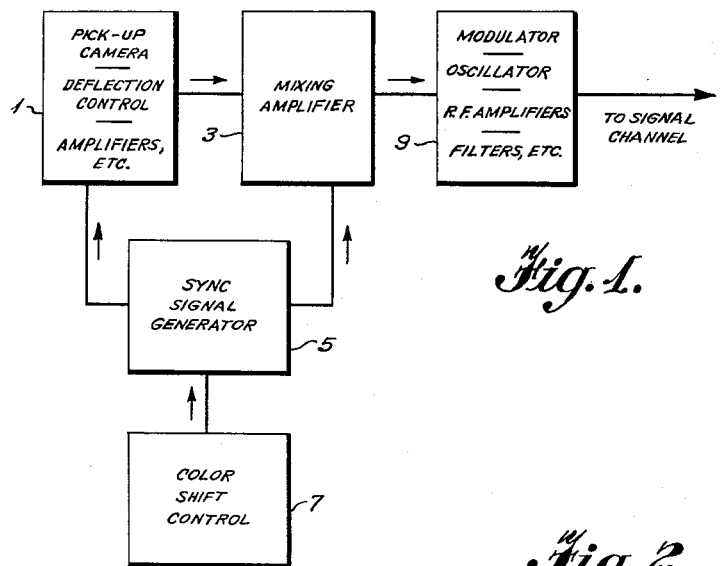
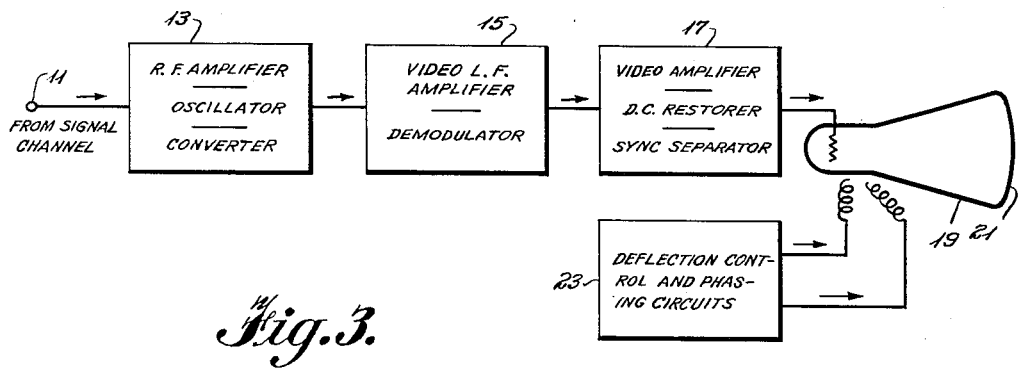
PATTERN WITH SINGLE SHIFT
INVENTORS
George E. Sleeper, Jr., and
Robert J. Stahl
BY Lippincott & Smith
ATTORNEYS May 22, 1956  G. E. SLEEPER, JR., ET AL  2,747,013
POLYCHROME TELEVISON WITH COLOR SHIFT
Filed March 14, 1950  7 Sheets-Sheet 2
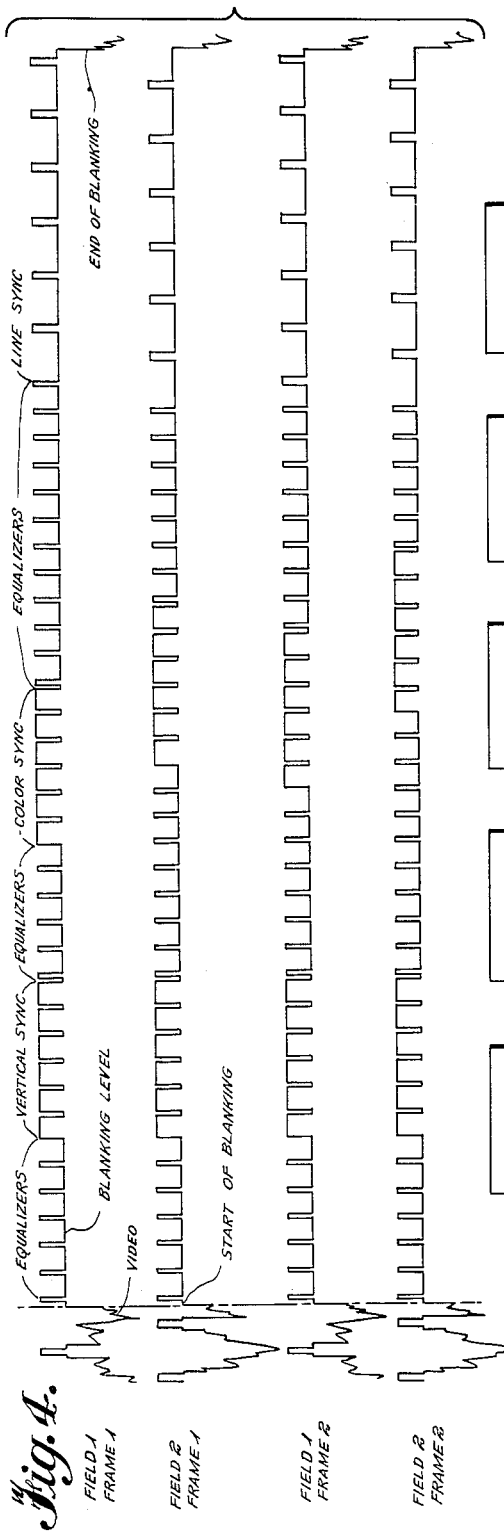
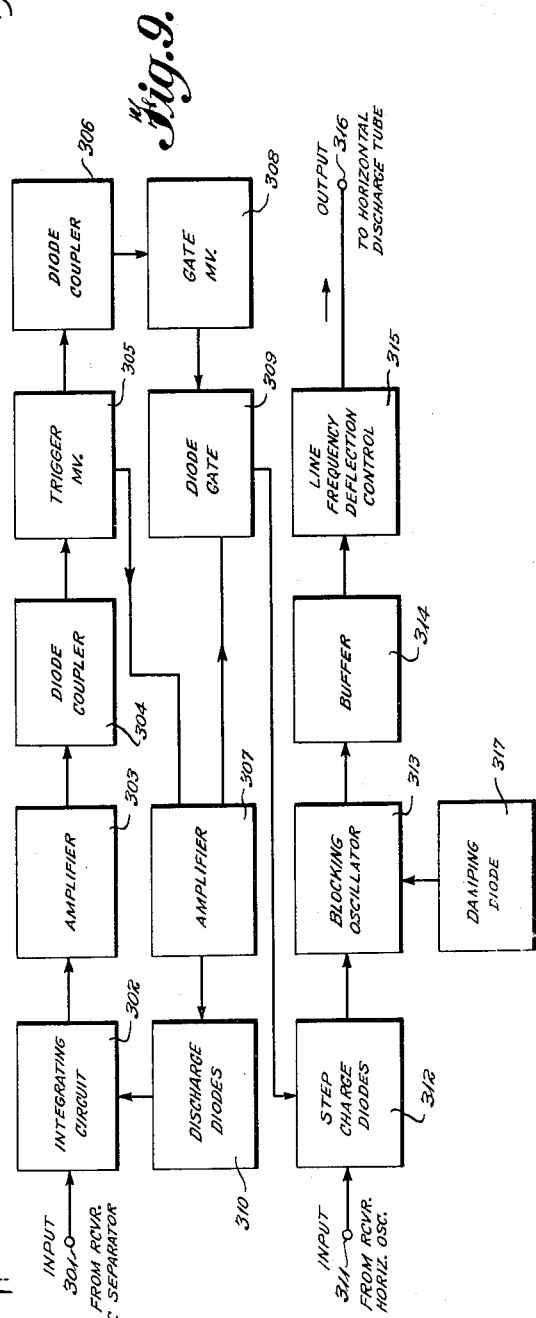
INVENTORS
George E. Sleeper, Jr., 3rd
Robert J. Stahl
BY Lippincott & Smith
ATTORNEYS

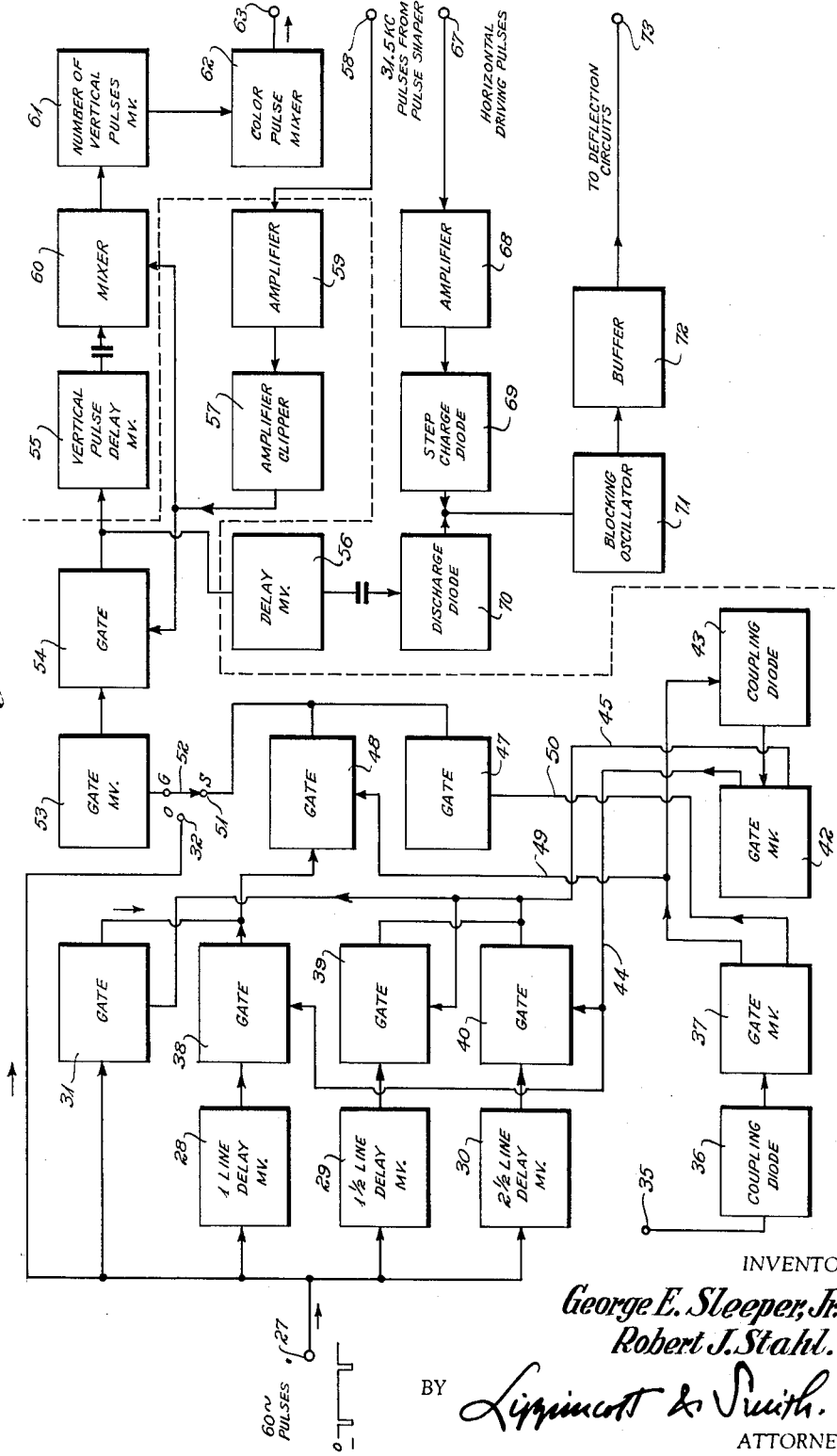

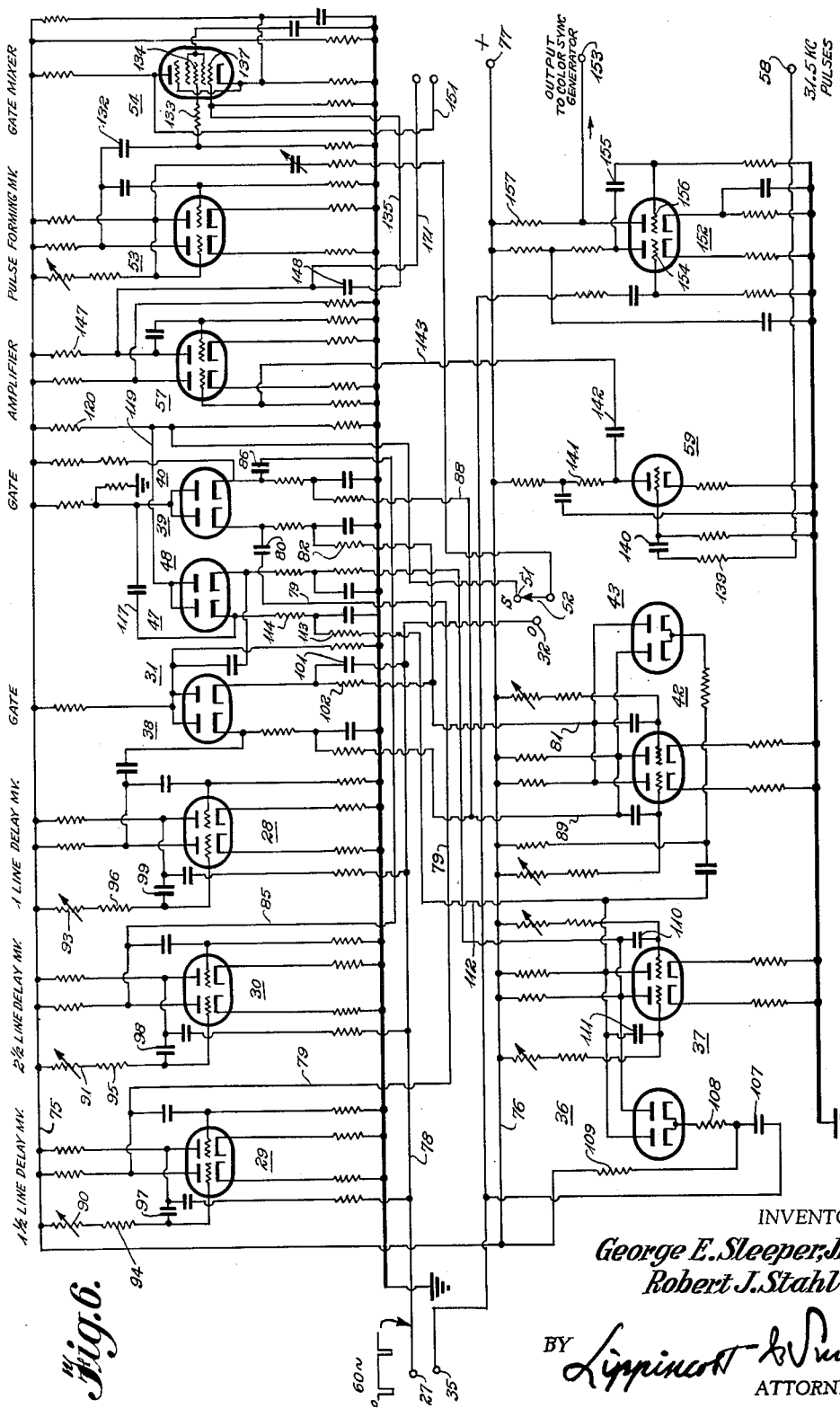

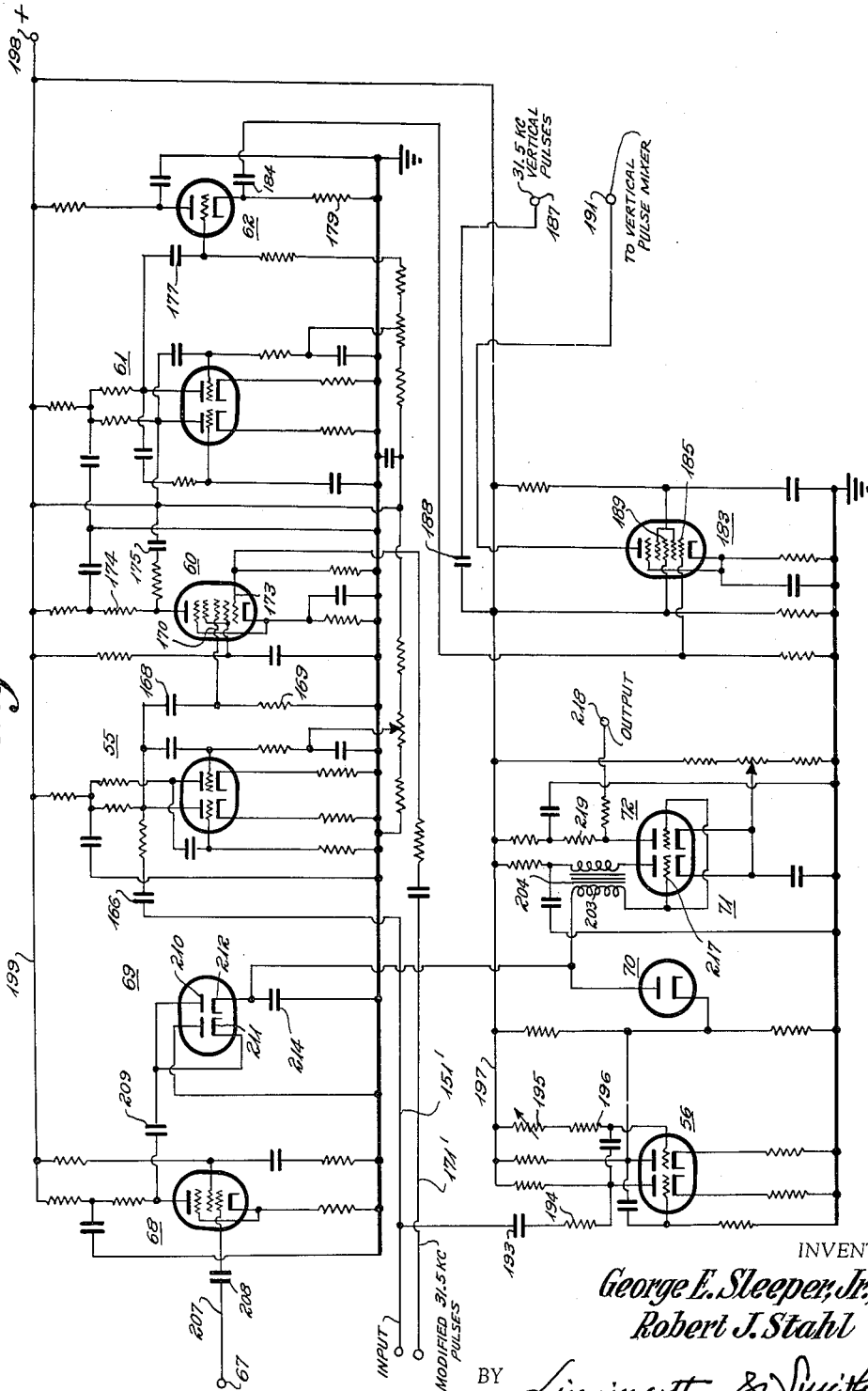

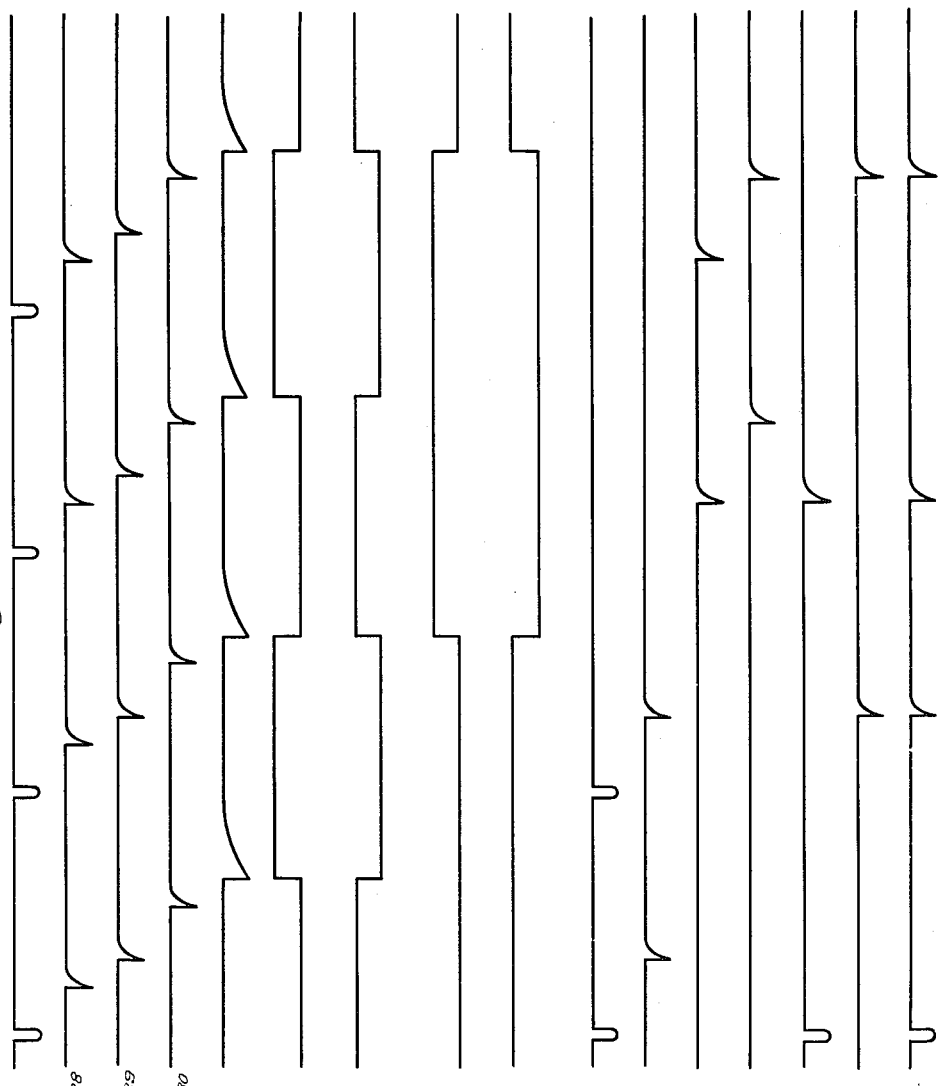

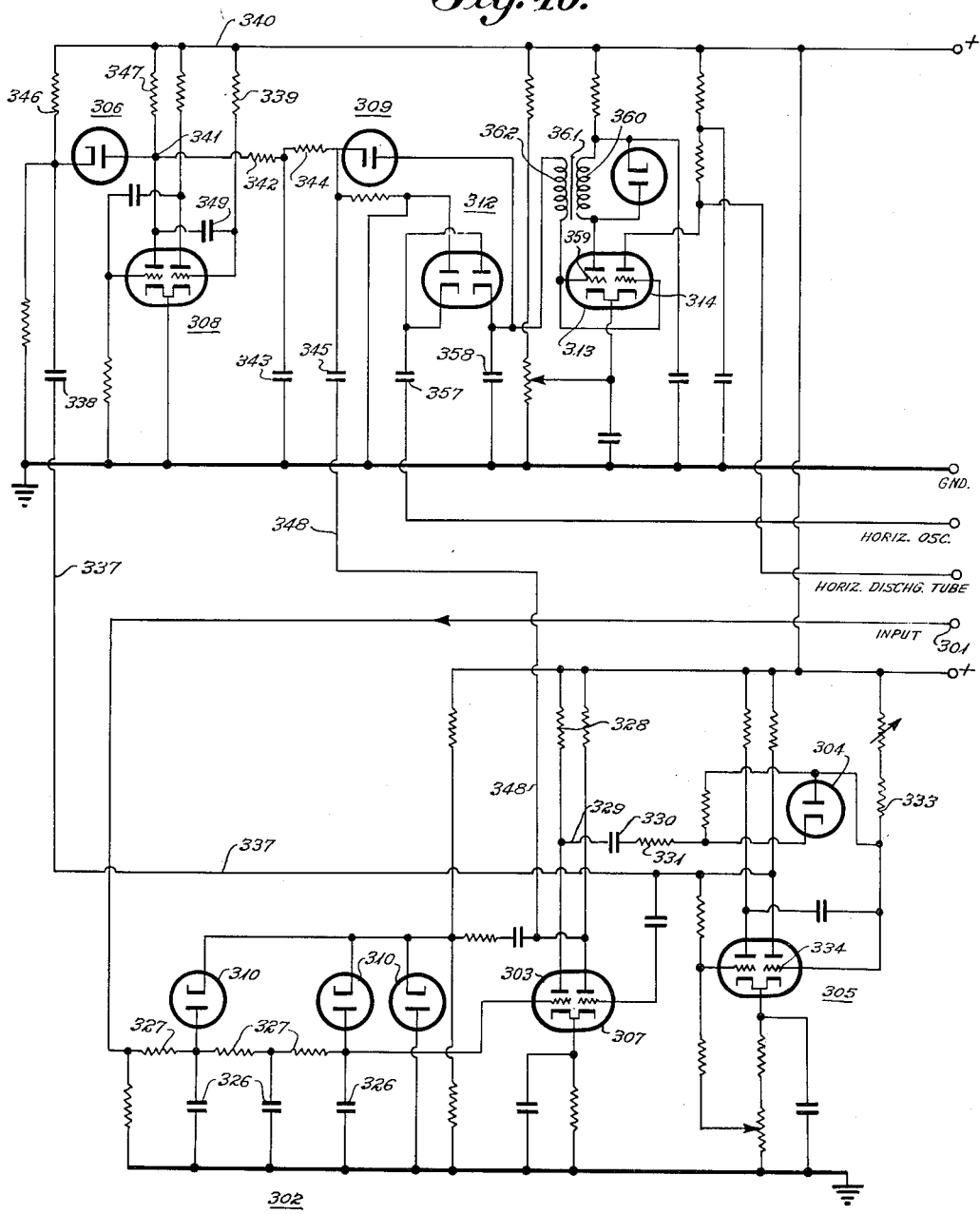

2,747,013

POLYCHROME TELEVISION WITH COLOR SHIFT

George E. Sleeper, Jr., Berkeley, and Robert J. Stahl, Redwood City, Calif., assignors to Color Television Incorporated, San Francisco, Calif., a corporation of California Application March 14, 1950, Serial No. 149,578

20 Claims. (Cl. 178—5.4)

This invention relates to television apparatus. It is particularly concerned with television apparatus of the additive polychrome variety. The principles of the additive tricolor are relied upon for analyzing the subjects at transmission points and for recreating from the thereby-produced signals tricolor images at points of reception.

In the particular form in which the invention herein to be set forth will be described, reference is made to the so-called line sequential color television principles for illustrative example. By this method of analyzing and reproducing television subjects in color each line of the image raster sequentially developed is traced in a different color of a color cycle according to which image analysis occurs. For tricolor operations this color cycle will be assumed, for instance, to be red, green, blue, red and so on. Under the conditions herein described the image lines as recreated will follow such a color line pattern.

By standards of television now in effect in the United States, images are analyzed at the transmitter and recreated at receiver points in such a way that the picture (frame) or image raster consists of 525 picture lines (neglecting, of course, blanking periods for reasons of simplicity), which are interlaced in a 2:1 relationship, and in which picture fields are recreated at the rate of sixty per second to produce the thirty complete picture frames.

The resultant images in black-and-white are usually caused to appear as intensity modulated traces on the target or screen of a cathode ray image producing tube for viewing. The resultant images may be viewed directly as with many of the presently marketed television receivers, or indirectly as by many of the currently marketed projection types of television receivers. Utilization of the line sequential principles of television scanning for tricolor operations make possible great degrees of freedom of design and at the same time make possible readily adapting the color scanning operations to existing black-and-white transmission and reception methods. There is complete compatibility between the black-and-white operations now in effect and the color operations to be brought about by utilization of the invention herein to be described.

In the line sequential operations, as has already been explained in a concurrently-filed patent application Serial No. 149,577 of the present inventors joined by C. Frederick Wolcott in an application entitled "Line Sequential Color Television Apparatus," and as has already been explained in the now abandoned United States Patent application of George E. Sleeper Jr., Serial No. 121,861, filed October 17, 1949, for an invention entitled "Multicolor Television," images can be recreated in such a way that the successively traced lines are reproduced each in a different color of the color cycle. This brings about an image analysis and reproduction which portrays the resultant image in all of its colors. However, in the absence of the injection of any color shift in the manner in which the successive lines of the image raster are traced, a maximum image definition in the field or vertical direction of scanning is usually not attained. Therefore, to increase color definition in the vertical or field scanning direction, it has already been proposed to analyze and reproduce the color image in such a way that in successive fields the color line scanning order is so shifted that each line of the picture is created in at least two colors of the tricolor in the case of single shift operation, or in all three colors of the tricolor in the case of double shift operation. Various patterns of shift may be adopted, it being important that the selected shift pattern be such that no so-called color crawl or jitter comes about in the resultant picture by reason of a choice of color shift orders. If color crawl should occur the various colors appear predominantly to move upwardly or downwardly, or both upwardly and downwardly, so that the individual color pattern may readily be followed by the eye. Such conditions are objectionable and generally intolerable. Various patterns in which there is a complete freedom from such effects are known. Some have already been described in the above-mentioned patent applications. One such pattern is herein referred to as illustrative of a practical operation.

For the purpose of the present considerations, it is important that note be taken of the fact that the shift pattern to be brought into being is one in which the various lines of he picture as it is scanned and recreated may shift from time to time according to a selected color shift order such that the individual lines may be scanned in two or more colors. Where the scanning can be accomplished in such phase that each line of the picture is scanned in each color of the tricolor and all effects of color crawl and the like avoided, it of course will be evident that, provided the line repetition rate is sufficiently high, the double shift scanning operation will provde a color definition in the vertical or field deflection direction corresponding substantially to that attainable for monochrome analysis. This will be three times as high definition as could be had with the line sequential scanning pattern in which no color shift (zero shift) is utilized. Where a shift pattern is utilized and shift is made in such phase that each line appears in only two colors of the tricolor, considerably improved vertical color definition is attainable over conditions of no shift. For general reference purposes this will be considered as being approximately twice that which could be had in the absence of any color shift in the pattern. As a means to illustrate principles in the present application, reference will be made to the so-called single shift operation, although it will be understood that the principles set forth apply equally well to the double shift operation.

Illustratively, to consider one condition of shift pattern, it may be assumed that the scanning takes place according to the existing black-and-white standards of 525 picture lines per frame, with each frame comprising two picture efilds of 262½ lines each, with each successive field interlaced with respect to the other. The black-and-white standards require that the repetition rate be such that each picture field is recreated in ⅟₆₀ second period and that thirty pictures frame are produced each second. Under such conditions it might be assumed that the odd lines of the first field are traced in the colors of the color cycle in such way that lines 1, 3, 5, 7, and so on appear in the colors of red, green, blue, red and so on. Then, for the second traced field, lines 2, 4, 6, 8 and so on would be recreated and would appear in the color sequence blue, red, green, blue and so on, in the absence of any color shift. Still considering that color shift is not relied upon (this would be a condition for zero shift, for instance), the color line traces in all succeeding odd-numbered fields and on succeeding even-numbered fields would be precise duplicates. However, if recourse is had to color shift, such a color shift might be introduced at the commencement of the third scanning field, for instance, in such a way that lines 1, 3, 5, 7 and so on, were traced to appear in the colors green, blue, red, green and so on, and then the even line traces 2, 4, 6, 8 and so on of field 4 would appear in the colors red, green, blue, red and so on. Fields 5 and 6 would be duplicates of fields 1 and 2, and fields 7 and 8 would be duplicates of fields 3 and 4, and so on.

The color shift thus proposed would be one of the single shift variety and it will be noted that the shift is caused to occur by producing a one-line displacement in the forward direction (this would be equivalent to a two-line displacement in the backward direction) following each second field scanning. This is purely illustrative, and is mentioned herein for the purpose of disclosing a principle of operation. Other forms of shift pattern and further explanation concerning its nature have been set forth in the applications above-mentioned, and reference may be made thereto if desired.

To achieve the various types of color shift hereinabove proposed, the apparatus and system described by the aforesaid U. S. patent application of George E. Sleeper, Jr., operated to bring about the color shift by reason of a control (in the illustrated form) of the deflection amplitude of the line scanning trace of the cathode ray beam across the image producing tube target. Such a target may be the luminescent screen of a cathode ray image-reproducing tube or the mosaic-responsive image-receiving target of a cathode ray camera tube, for instance. Such control always is effected during blanking periods so that no shift occurs while the beam trace is actually viewed.

One of the most convenient arrangements to provide for line-sequential forms of television scanning operations is to have the image-transmitting tube target or the receiving tube target formed or divided into contiguous areas. Each area is of standard aspect ratio. Each is arranged side by side with respect to each other. The cathode ray scanning beam in its deflection is caused to trace from the first area to the second to the third and then snap back to the first area. The receiver tube target in such a system also consists of three areas coated with different phosphors or other substances, producing luminous effects under electron beam impact. Impact of the scanning electron beam as it is modulated by received signals produces on one target section a line image in one color. After this has been accomplished, the continued lateral sweep of the scanning cathode ray beam, after an interruption corresponding to the blanking period, moves over upon a second color-responsive area. At this area the next picture line is traced in a different color. Next, the beam trace is blanked, after which the beam moves into the third coated area to produce the next picture line in the third component or primary color.

This means that the time period over which the scanning beam traces each target section representing one color is equivalent to that required for one line of scanning of a black-and-white picture. Consequently, under existing black-and-white standards, the scanning beam, for the color television line-sequentiial operation, is caused to move across one target section in $1/15,750$ second, precisely the time period allotted for scanning one line of a black-and-white image. Where there are contiguously-positioned component color-responsive areas on a tube, the scanning beam moves from one colored area to the next and finally traces one line in each of three areas. This requires, for the three colors, the same time period as that necessary to trace three successive lines of a black-and-white image. The scanning arrangement for normal black-and-white is such that signals produced upon a black-and-white image-producing tube do not usually spread over a plurality of adjacent areas having different phosphors but trace successive lines of the now-standardized black-and-white pattern on a tube. This being done, a black-and-white image results.

If, however, color transmission with color shift is utilized, then, as noted in the patent application above mentioned, the control of the color scanning pattern is brought about through the exercise of a special control upon the line or horizontal scanning beam motion. The color shift is brought about by modifying the scanning beam deflection in its lateral motion within the cathode ray tube. Instead of permitting the beam to be deflected in a linear path to scan one line of all the red, the green, and the blue phosphors, the scanning beam is caused to move, for instance, across the red, the green, and a part of the blue (for example, half of the blue) and snap back to recommence the scanning of the red area.

A one-line color shift may be effected by lengthening or shortening the deflection trace. Where the deflection trace is shortened it of course is apparent that the scanning beam will be moved back to start a new cycle of operation at a time in advance of that normally to be expected, and by selecting the advance period such that within the blanking period a one-line shift, for instance, is effected, the desired end result may be had. Where the beam scans and the path is successively lengthened by delaying the time of the beam snapback after completing the scanning in one of the colors, say the third, for a time period of the order of one line or two lines, it will be appreciated that the net effect is as if the beam had moved backwardly through one or two colors. In any case, the scanning beam after following such patterns of shift enters the visible window initially in a different color area than otherwise would have been the case. However, the shift in the scanning pattern, or, in other words, the effect causing the initial scanning to appear in a different color from field to field is brought about during a period of vertical blanking, so that to the observer the advancement or retardation of the scanning path of operation is unnoted. The effect is as if there had been an actual shift in the color of the light-producing phosphor for the particular area in question. The shifts are always caused to occur during the period of vertical blanking, as standardized in television transmission, and as defined by the presently-adopted "Standards of Good Engineering Practice Concerning Television Broadcasting Stations" as published by the Federal Communications Commission, Washington, D. C., and made effective as of December 19, 1945. The blanking period so allotted corresponds to a period of 21 lines of a black-and-white image and is generally a satisfactory period within which to effect the shift operation. A similar blanking period may illustratively be assumed for this invention.

The present invention is concerned mainly with ways and means to effect this color shift. It is primarily related to ways and means to effect the color shift by exercising a control over the scanning cathode ray beam in the camera tube and in the scanning cathode ray beam tracing screen or target of the image reproducing tube. This is in contrast to the proposal made in the concurrently-filed application of the present inventors joined by C. Frederick Wolcott, where the color shift was brought about by a variation of the duration of the vertical scanning operation. This means that a successively different number of total scanning line periods intervene between successive vertical beam deflections, although from the standpoint of the visible operation, the number of scanning traces within the visible window remains constant because the shifting occurred during the periods of vertical blanking. The operation is a change in the relative phase of the field and line deflections.

This present application, however, is concerned with the feature of exercising a control of the shift operation by controlling the line motion of the scanning cathode ray beam and maintaining precisely constant at 262½ lines (as for standardized black-and-white) the time period intervening between successive shifts or deflections of the scanning beam in the vertical or field direction of deflection. In this sense the present invention is directed to a field similar to that proposed in the above identified application of George E. Sleeper, Jr., Serial No. 121,861.

In the aforesaid Sleeper application the color shift took place under the control of a slotted pulse signal used also for line synchronization. It has been found, however, that considerable improvements may be brought about from the standpoint of reliability of transmission through the use of the present invention. This is because the slotted pulse type of signal often became unreliable particularly in signal fringe areas during periods of critical noise tending to mask or mutilate the controlling signal. Also, in those areas where multipath transmissions became particularly objectionable the multipath or ghost effect often tended to impair the quality of the slotted pulse.

Still further, it has been found particularly with respect to the vertical signal under extremely adverse conditions of transmission, that the vertical oscillator often does not follow faithfully the shifting vertical synchronizing pulses and this failure fully to track is often sufficient to cause some jitter in the resultant pattern and particularly in the patern when the signals developed in polychrome were reproduced on monochrome receivers as black-and-white replicas. The effect is one which is practically dependent upon both transmission and reception and may even occur under ideal signal transmitting conditions.

The present invention provides for exercising the color shift control through the use of signal waveforms which are precisely of the form now adopted and approved as standard for black-and-white television transmissions, although it will be noted that to effect the shift certain of these signal forms have been used in multiple, so as to provide the desired effect. The significant factor, however, is that all signal waveforms are of such character that television operations heretofore carried out have established the fidelity of signal transmission of the pulse formations to an extent such that greater reliability of transmission operations can be had than was heretofore possible with other signal forms.

In connection with signal transmissions of this character, it is important not only that provision be made at the receiver for responding to transmitted signals causing a shift in the color after a certain number of line scannings have occurred, but also that there be provision at the receiver for relating or phasing the color operation between the receiver and the transmitter in such a way that transmitter and receiver instrumentalities always scan and reproduce the same color concurrently.

The present invention has as one of its main purposes that of providing ways and means to simplify and improve the obtainment of color shift operations in polychrome television transmission. It also endeavors to improve the stability of operation of line sequential types of polychrome television image production. In the broader aspects the invention herein to be described comprises a transmitter arrangement such that the synchronizing or control signals for establishing line and field deflection of the scanning beam of each of the transmitter and receiver ends shall function in precisely the manner of black-and-white apparatus now existent. This is in order to establish complete compatibility between the polychrome methods herein to be set forth and the already-existing black-and-white operations.

Next, the invention contemplates combining with this form of signal transmission a signal series which can be utilized at polychrome receivers to effect both color shift and color phasing, and which signal form shall have no effect at all upon monochrome receivers, or no deleterious effect at least, upon the image reproduction, whereby the monochrome receiver shall be capable of recreating a polychrome transmission as a monochrome reproduction without in any way modifying the monochrome receiver and yet the same signal, when received on a polychrome receiver, shall be capable of bringing into being the reproduction of a polychrome image wherein the advantageous effects of color shift operations are introduced.

In a more specific sense, the present invention contemplates the development of the usual form of line synchronizing pulses now standardized for black-and-white operations during the complete time period intervening between successive vertical blanking and deflection periods. During the period of vertical blanking which commences, according to black-and-white standards, each 1/60 second, there are produced the usual six short-duration equalizing pulses of double line frequency, followed by the six long-duration vertical deflection pulses, occurring at double line frequency. This second pulse series controls the vertical deflection or synchronization in each of the polychrome and the monochrome receivers. In the polychrome receiver arrangement herein to be described, the shifting operation is controlled by the next portion of the signal series (supersync signals) transmitted during the period of vertical blanking. This signal series consists in the example herein to be illustrated of a second group of equalizing pulses illustratively varying in number between six (the number now standardized for black-and-white operations at this point) and eleven. These pulses are followed by six additional pulses of precisely the form used for vertical synchronizing. These are long duration pulses occurring at double line frequency and to distinguish this set of pulses from the vertical sync pulses the second set of long-duration pulses of double line frequency will herein be termed "color sync signals." The last-produced color sync signal pulses are then followed by additional equalizing pulses which may illustratively vary between eleven and six such pulses, after which, for the remaining portion of the vertical blanking period synchronizing signals occurring at line frequency will be developed and transmitted.

By already-existing standards for black-and-white operations, this vertical blanking period is established at 5% of the time period required to trace 262½ picture lines, with a tolerance permissible up to and including an additional 3% time period. This makes the total permissible vertical blanking period equal to 8% of the total vertical cycle or, in other words, the period may correspond, under present standards, to 21 black-and-white picture lines. Accordingly, it is evident that the proposals herein made are such that any control exercised by way of signals controlling either vertical deflection or the line shift may all occur during vertical blanking periods and thus be ineffective from the standpoint of observability in the final pattern. It is nonetheless to be understood that the blanking period may be lengthened or shortened if desired without departing from the principles set forth by this disclosure.

Such a signal series as has been above explained then is combined with the video signal information to form a composite series of signals comprising all of video information, line deflection or sync information, equalizing pulse information, vertical deflection or sync information and color sync information, with blanking (i. e., a return to black level) occurring during all of the line, equalizing, vertical and color sync information. The composite signal series then is transmitted from the transmitter point to receiver points in such manner that the operation is equivalent to black-and-white procedures.

The apparatus herein to be described with respect to the transmission end of the system is of the character which is known in the art as studio equipment, in that it is a form of apparatus maintained and operated separately from the actual transmitter instrumentality itself. In this way the color television apparatus herein to be described may be used with any form of now-standardized black-and-white transmitter without in any way modifying such existing transmitters. The changes necessary to bring about color television operations rest wholly in the studio equipment, and in the receiver equipment used to receive the transmitted composite signals thus produced.

The signal series thus described, when directed to receiver points to recreate television images, is such that the video information creates electro-optical images in the several colors. The color in which the video information instantaneously transmitted shall reproduce the video modulation is determined in accordance with the receiver response to the signal series herein to be described. Where there is a variance between the color in which the instantaneously received video signals recreate an image and the color in which the image is intended to be recreated, the invention herein to be described provides ways and means by which the receiver operations may be recycled completely automatically, so as correctly to phase receiver and transmitter operations, as desired. These effects are generally instituted by the utilization of the second series of long-duration pulses, herein termed color sync pulses, in such a way that they control the phase relationship of the receiver color reproduction with the transmitter. The color sync signal series is caused to become ineffective insofar as vertical deflection or field deflection control of the transmitter is concerned. Likewise, in the color receiver operations the long-duration vertical sync pulses are ineffective to establish color phase of the polychrome receiver operation. It is in the receipt of the combined signal series that the phasing operations take place and the deflection control or the establishment of the color in which the instantaneous video modulation is reproduced is established by a precise control of the composite operation.

With these features and general principles in mind, it becomes an object of this invention to provide an improved line sequential polychrome television apparatus wherein by taking recourse to color shift operations vertical or field deflection directional reception and picture detail is improved.

A further object of the invention is that of providing higher stability of color shift controls than has heretofore been possible. A further object is to add color shift for use with polychrome receivers in such a way as to avoid impairment of black-and-white receiver operations. Another object of the invention is that of providing apparatus and circuits to establish line sequential color television image reproduction with color shift where the controlling circuits are given the greatest possible immunity to the effects of noise and interference of all varieties, without impairing the fidelity of color reproduction. Other objects of the invention are those of providing television apparatus wherein the desired fidelity of transmission, reception and image reproduction quality are had at a minimum of expense. Black-and-white receivers may be adapted to polychrome by a minimum number of circuit components, such as tubes, condensers, resistors and the like, as herein to be described.

With the foregoing features of the invention in mind, the following description, when read in connection with the drawings, will explain the principles and nature of the operation concerned. In the several accompanying drawings, Fig. 1 is a block diagram illustrating schematically a transmitter unit incorporating the present invention;

Fig. 2 is a schematic block diagram of a television receiver incorporating this invention.

Fig. 3 is a chart illustratively to present in diagrammatic form one general color pattern which may be reproduced through the utilization of the herein-described invention as embodying a single shift operation;

Fig. 4 is a schematic representation of the supersync waveform occurring during vertical blanking periods for four successive fields of image transmission, so as to represent the general relationship between all of the equalizing, the vertical sync, the line sync and the color sync signal control pulses in this vertical blanking time interval;

Fig. 5 is a block diagram schematically to represent the color sync and shift pulse generator serving to control the production at the transmitter in desired time relationship with respect to the other signals and by which the color sync signals are caused to vary in position relative to the vertical sync pulses;

Fig. 6 is an illustrative circuit diagram of a color shift chassis for use in connection with part of the apparatus shown in block form in Fig. 5;

Fig. 7 is an illustrative circuit diagram of a second part of the pulse generator arrangement diagrammatically represented by Fig. 5;

Fig. 8 is a series of waveforms (not drawn to scale or to a specific time relationship or signal polarity) to illustrate the operation of the circuits of Figs. 5, 6 and 7;

Fig. 9 is a block diagram of a portion of the receiver instrumentality incorporating the circuit components used to effect color sync and shift in line sequential color television receiver apparatus; and Fig. 10 is a diagram illustratively representing one form of circuit schematically depicted by the block diagram of Fig. 9.

Making reference now to Fig. 1 of the drawings, some of the more important components of a television pickup system are illustratively represented. The unit 1 may comprise the pickup camera, the deflection control, the amplifiers, and so on, and serves as the general medium for converting optical images into video signals. The components shown are purely illustrative, and this is generally a standard item for television studios, except insofar as modification to adapt the unit to color operations is necessary. Such black-and-white components are generally well known when the apparatus is to be used for line sequential polychrome operations. Nonetheless, reference may also be made herein to the disclosure of George E. Sleeper, Jr., application Serial No. 121,861, herein previously mentioned.

Output signals from the unit 1 are generally supplied to a mixing amplifier 3 which receives signals from an appropriate form of sync signal generator which has been represented at 5. The sync signal generator develops all of the line sync, the vertical sync and the equalizing impulses which are combined with the video signals in the mixing amplifier to provide the composite signal series at receiving points to recreate the television images.

In connection with the arrangement herein to be described, the color shift control unit 7 embodies those components which will be particularly set forth and described in connection with the showings of the block diagram of Fig. 5 hereof and illustrative circuit components of Figs. 6 and 7. The effect of the color shift control is to provide with the normal form of control signals from the sync generator 5, as for black-and-white, the additional signals necessary to effect color shift for color sync operations in a color system. The combined and composite signal series is then supplied to the conventionally represented modulator, oscillator, R. F. amplifiers, vestigial sideband filters, and the like, schematically represented at 9.

Output signals from the several elements represented at 9 may then be supplied by way of a radio transmission link or by way of cable connection to suitable receiver or monitoring points, or supplied to networks for distribution. The components represented at 9 are those generally found in any presently-existing television transmitter station, over and above the normal studio equipment and control room apparatus.

In Fig. 2 there has been diagrammatically illustrated in extremely schematic form a television receiver, disregarding, of course, any audio components which may be utilized. Audio components have likewise been excluded from consideration in the showing of Fig. 1. However, it may be said that where audio signals are considered, they are transmitted according to standardized methods on a carrier which is spaced by present standards at 4.5 megacycles from the video carrier. The audio signals appear as frequency modulations of the audio carrier, while the video signals for transmission as a broadcast service which can be received in homes and the like appear as amplitude modulations of the video carrier.

Such signals as are received from the transmitter such as that represented at 11 may be received in the R. F. amplifier passed through the converter to which suitable heterodyne frequency is applied. This component is represented at 13 in Fig. 2.

The resultant intermediate frequencies are applied in known manner through the video I. F. amplifier and demodulator. This is represented at 15. In the unit 17, further amplification of the video signals occurs, the sync signals are separated from the composite signal, and the D. C. component is reinserted prior to placing the video signals on the modulating system of the cathode ray tube 19. Modulation of the cathode ray beam developed within the image reproducing tube 19 causes intensity-modulated signals to appear upon the luminescent screen or viewing target 21 of the tube. The sync signal separated in the unit 17 may be supplied to the deflection control and phase circuits represented at 23. The output signals resulting are then supplied to the deflection coil system (unnumbered in Fig. 2) to control the deflection path, followed by the scanning cathode ray beam, and thus control the pattern or raster produced. Certain of the elements represented by the component 23 which have been described in the schematic illustration of Fig. 9, and more particularly shown in one of the several forms in the circuit diagram of Fig. 10.

Now making reference to Fig. 3 of the drawings, one pattern of line trace utilizing a single shift operation is depicted. In this figure the various fields are represented in a direction moving from left to right. They are represented by the Roman characters. The several lines of each field are represented in the vertical direction and are designated by the Arabic numbering. The various colors in which the various lines of the line sequential pattern are assumed to be traced are designated by letter only, with the letters R, G and B designating respectively the colors red, green and blue. The single shift pattern depicted by Fig. 3 is essentially that already described above, and it will be noted that in each fourth field traced there is a duplication of the color in which each line is represented, and it will likewise be noted that the patterns are so traced that interlaced operations of a character like those had for black-and-white representations result. With the explanation above having set forth to some considerable extent the nature of the various forms of shift patterns, it is believed that further reference to Fig. 3 is unnecessary, although it may be pointed out that the concurrently-filed application of the present inventors, joined by C. Frederick Wolcott, and the George E. Sleeper, Jr., application Serial No. 121,861 may be referred to for further explanation of this form of pattern.

Now making reference to Fig. 4 as illustrative of the supersync waveform occurring during a period of vertical blanking (e. g. where modulation is at black level), it will be seen again that a pattern of four successive fields is proposed. The significant factors are that in the first field one finds during the vertical blanking period the usual six equalizing pulses, followed by six long-duration vertical pulses (as for black-and-white). These pulses are then followed in order by five equalizing pulses, six more long-duration color sync pulses (these pulses are precisely of the form of the vertical sync pulses previously mentioned) and eleven equalizing pulses, after which pulses occur at line frequency for the remaining period of vertical blanking. The developed pulses are in the supersync region and are usually considered as blacker-than-black or ultra black. In the second field, as vertical blanking commences, the usual six equalizing pulses and the six long-duration vertical sync pulses occur as for black-and-white. However, in that color shift and color phasing operations are to be effected under the control of the color sync pulses, there is a variance in the second field as compared to the first field of the number of equalizing pulses following the vertical sync pulses, and it is to be noted that in field 2, eight equalizing pulses follow the vertical sync pulse series and these, in turn, are followed promptly by the same character color sync pulses, consisting of six long-duration pulses of the character used for vertical sync. These color sync pulses are then followed by additional equalizing pulses which, in the second field, are shown as eight in number. Line sync pulses then complete the blanking period. The third and fourth fields again represent further modifications, but in view of the explanation hereinabove made, and in view of the fact that the color shift pattern already described is pointed out as having occurred under the control of the color sync pulses, further explanation of the patterns of fields 3 and 4 is considered unnecessary. However, reference to the showings in all of Figs. 5, 6 and 7 particularly will set forth the fact that a shifting in the location of the color sync pulse series establishes the control herein pointed out as bringing about the color shift in the image receiver.

The waveforms of Fig. 4, as above noted, represent substantially only those portions of the field cycles which come within the vertical or field blanking period. It will be observed in this figure that the wave designated as representative of the blanking period for field 1 of frame 1 is formed so that during the blanking period there appears first six equalizing pulses. These are followed by six long-duration vertical sync pulses, after which there appear five equalizing pulses, followed in turn by six color sync pulses. These color sync pulses are followed by eleven equalizer pulses, after which line sync pulses are developed during the remaining portion of the blanking cycle.

The arrangement suggested for positioning the various color responsive areas, whether they be the color-sensitive areas of the camera tube mosaic or the light-producing phosphor areas of the image reproducing tube, has been assumed to this point as being adjacent one another. With an arrangement of such character the scanning beam as it traces from top to bottom of the combined area completes one field of vertical deflection (in the absence of any color shift) at a central point in the most centrally positioned of the three separate areas. Such a point corresponds in a color picture to a displacement of 1½ lines of black-and-white image scanning (this is equivalent to ½ line of a black-and-white picture, since it is midway in one of the three adjacent areas). Accordingly, to hold interlace and in the absence of any color shift insofar as the polychrome operation is concerned, it can be seen that for field 2 of frame 1 the color sync pulses should be shifted 1½ lines of black-and-white, or ½ the time period required to reproduce those picture lines which will represent all colors of the tricolor.

Consequently, in the waveform shown for the blanking period of field 2 of frame 1, there are the usual initial six equalizing pulses, each of extremely short duration, followed by six long-duration vertical sync pulses. In contrast to the five equalizing pulses of field 1 which followed the vertical sync pulse, the pulse arrangement of field 2 of frame 1 is such that the vertical sync pulses are followed by eight equalizing pulses and then six long-duration color sync pulses, after which another group of eight equalizing pulses precede the normal line sync pulses which continue for the remaining portion of the selected vertical blanking period. It is significant at this point to note that the number of equalizing pulses following the vertical sync pulses and those following the color sync pulses again total sixteen, as was the case with respect to the wave represented in field 1 of frame 1.

In the absence of any line shift for field 1 of frame 2, the waveform representation would be precisely the same as for field 1 of frame 1. However, with an assumed shift of one color line in field 1 of frame 2, the six long-duration color sync pulses will shift with respect to the vertical sync pulses by one line of a black-and-white picture, which accounts for the displacement of the color sync pulses in field 1 of frame 2 from the position in time at which the color sync pulses of field 1 in frame 1 were represented. This then provides seven equalizing pulses following the normally produced vertical sync pulses. To total the assumed sixteen equalizing pulses surrounding the color sync pulses, an additional group of nine equalizing pulses has been illustrated as following the color sync pulses of field 1, frame 2, prior to the recommencement of line sync pulse transmission. The conditions prevailing for field 2 of frame 2 follow from the explanation above given with respect to field 2 of frame 1, wherein reasons were set forth for displacing the color sync pulses by 1½ lines of a black-and-white picture with respect to the color sync pulses of the odd-numbered field. Consequently, in field 2 of frame 2, ten equalizing pulses precede the color sync pulses (that is, follow the vertical sync pulses). The color sync pulses are followed then by six equalizing pulses prior to the recommencement of the transmission of line sync pulses.

With single shift operation the third produced picture frame is a precise duplicate, insofar as the waveform occurring during vertical blanking is concerned, to that shown for field 1 of frame 1. Likewise, for single shift operation field 2 of frame 3 will be a duplicate of field 2 of frame 1. The sequence described then follows in order.

The block diagram of Fig. 5 will be referred to very generally to set forth the principles relied upon to provide for shifting the above-mentioned group of six long-duration color sync pulses back and forth within the assumed shift period of 2½ lines of a black-and-white image period. This assumption, it will be appreciated, is illustrative of one condition of operation to establish the so-called single shift for a line sequential polychrome television operation. In this form of control, pulses occurring at a frequency of 60 cycles and phased with the start of vertical blanking and derived from the standard form of sync signal generator are supplied at the terminal point 27. From this point these signals feed concurrently to three different delay multivibrators 28, 29 and 30, wherein different delay periods are introduced. For illustrative purposes, these multivibrators introduce delays of one line, and one and one-half lines, and two and one-half lines respectively, referring the line period to that of black-and-white scanning and thus corresponding to multiples of a time period "H" which equals approximately 63.5 microseconds for the now-standardized black-and-white operation. The same input signal also is supplied to a gate 31 and is likewise passed to a terminal point 32, from which point it is utilized only in the event that the single shift operation is removed. When a signal is used at terminal 32 the effect is to bypass the complete color shift control unit as will be evident from the showing of Fig. 5. At the same time that signals are being applied to the input terminal point 27, another series of stepping pulses occurring at 60 cycles and appropriately phased with the end of the equalizing pulses and derived from the buffer amplifier in the pulse shaper unit of a sync signal generator output for black-and-white operations is applied at the terminal point 35. This latter signal is fed through a coupling diode 37 and into a gate multivibrator 37. The signals applied from the source 27 and fed through the delay multivibrators 28, 29 and 30 are then supplied to the gate circuits schematically represented at 38, 39 and 40 respectively. These gate circuits are controlled in accordance with the operation of a gate multivibrator 42, which is, in turn, controlled from a coupling diode 43, which latter element is supplied with output signals from the gate multivibrator 37. The gate multivibrator 42 controls in one polarity the operation each of the gates 38 and 40 by way of the signal supply through the conductor 44, and in the other polarity the gate multivibrator 42 contacts through the conductor 45 each of the gates 31 and 39 respectively, so that these pairs of gates operate alternately. Output signals from the gates 39 and 40 are supplied to the gate 47 and the output from the gates is supplied also to the gate 48. Signals derived from the gate multivibrator 37 and which are of the same polarity as the signals fed to the coupling diode 43 are supplied through the conductor 49 to control the gate 48. Signals of the opposite polarity are fed through the conductor 50 to control the gate 47. The output signals from the gate 47 and 48 are then supplied to the terminal point 51, from which they are available by way of the switch 52 at the gate multivibrator 53. As will be explained from a consideration of Fig. 6 particularly, the signal thus available at the gate 53 is a 60-cycle pulse, but one which is shifted from pulse to pulse within a range of 2½ lines of a black-and-white picture. This pulse then serves, as will be apparent from the consideration of Figs 7 and 8, to control the time of development of the already-described color sync pulses. The multivibrator units, the gates and the like so far described are of generally standard character, but will be referred to more particularly in connection with the showing of Fig. 6. In the event that the color shift operation is not desired, the switch arm 52, instead of resting upon the contact point 51, may be moved over to the contact point 32, in which instance each of the units already described is excluded from the operation and the signals available at the input terminal 27 then feed directly to the gate multivibrator 53.

Signal output from the gate multivibrator 53 is supplied through a gate 54 from which they follow two paths, one being through the vertical pulse delay multivibrator 55 and the other through the delay multivibrator 56. The gate 54 is controlled as to its opening and closing time by the signal output from an amplifier and clipper 57, which is supplied with 31.5 kc. pulses from the sync signal generator pulse shaper unit made available at the terminal point 58 and amplified in the amplifier 59. These pulses are of standard form such as available in any black-and-white sync generator when impressed at the terminal point 58, and they serve to control the opening and closing periods of the gate 54 supplied with the shifted 60-cycle pulses from the gate multivibrator 53. Output signals from the vertical pulse delay multivibrator 55 are supplied to the mixer tube 60 along with the amplified and clipped 31.5 kc. pulses available at the output of the amplifier-clipper 57. From this point the mixed output signals are fed to the multivibrator 61, whose output is supplied to the color pulses mixer 62 and then at the terminal point 63 is supplied to the pulse shaper unit vertical pulse mixer of the sync signal generator wherein these pulses can be added through a circuit (not shown) in parallel with the normally-existing vertical pulse mixer. It may be noted that the multivibrator 61 serves to determine the number of pulses in the color sync signal series and, as operated, sets this number in this instance as precisely that number corresponding to the black-and-white operations for the vertical sync signals. It may be noted that with respect to the vertical pulse delay multivibrator 55, the mixer 60, the pulse multivibrator 61 setting the number of vertical pulses, and the amplifier 62, that these are essentially duplicates of components presently used in black-and-white sync signal generators, but there used for the purpose of controlling the vertical sync pulses, in contrast to controlling the color sync pulses as in the present disclosure. These components are triggered, it will be seen, later in the operational cycle than are the vertical sync pulses. They cause the produced pulse series to shift relative to the complete group of signals. The delay provided by the vertical pulse delay multivibrator 55 is to provide a fixed amount of delay relative to the shifted triggering pulse occurring at 60 cycles, which signals are available in the output of the multivibrator 53. This is to place the color sync in a proper time relationship with respect to the vertical sync pulse. The multivibrator 55, as are most of the others herein described, may be looked upon as being free-running and synchronized. The mixer 60 functions in such a way a to provide a standard form of signal and at the same time serves to reshape or clean up the pulse resulting from the output of the multivibrator 55.

At the terminal point 67 horizontal driving pulses from the pulse shaper of the standard black-and-white sync generator become available. These pulses are supplied through the amplifier 68 and the step charge diode 69 in such a way as to control along with the output of the delay multivibrator 56 as it is supplied through a discharge diode 70, a deflection control oscillator 71 of the transmitter. This arrangement is, in principle, generally like that which will be described in connection with receiver apparatus, but is arranged to function at the transmitter end of the system in such a way as to provide the line color shift with which the receiver operation will be coordinated. The blocking oscillator 71 then feeds its pulse through a buffer amplifier 72 to an output terminal 73 from which point the suitable deflection circuits may be controlled. The buffer amplifier serves merely as an element to prevent load circuit reaction upon the blocking oscillator tube, whose operation is triggered and controlled in accordance with the shift pattern introduced.

Reference may now be made to Fig. 6 for illustration of a circuit embodiment used to perform the functions set forth by that portion of the diagrammatic showing of Fig. 5 to the left of the dash line. In Fig. 6 the signal pulses occurring at a 60-cycle rate which are fixed with the start of vertical blanking and which are derived from a pulse former unit of a standard type of black-and-white sync signal generator are applied to the input terminal 27. From this terminal input the pulses are applied to the three delay multivibrators 28, 29 and 30, applying respectively a one-line delay, a one and one-half line delay, and a two and one-half line delay for the incoming signals. The multivibrators are generally of a type such that one of the multivibrator tubes has a positive grid potential applied thereto from the positive plate supply source on the conductor 75, which voltage is supplied initially through a conductor 76 from a source connected to the input terminal. The positive bias is applied by way of appropriately-connected resistor elements so that, in the instance shown, the grid of the left-hand half of each tube is normally maintained positive relative to the cathode elements. The incoming signal pulses are then applied by way of the conductor 78 from the input terminal 27 through the resistor elements and condensers indicated. Output pulses from the multivibrators are then applied to suitable gating tubes 38, 39 and 40 respectively. Signal pulses representing the output of the multivibrator 29 are supplied through the conductor 79 and the condenser 80 to the cathode element of diode 39, to which cathode control pulse voltage from the gate multivibrator 42 is also applied through the conductor 81 and the resistor 82. Signal pulses applied to this gatings diode 39 through the conductor 79 and 81 are of polarity such that they cause the diode 39 to conduct during periods when both pulses are concurrently applied by carrying the cathode to a potential negative relative to the plate.

A similar condition exists with respect to the 2½-line delay multivibrator 30, from which an output is derived in the conductor 85 to be fed through the coupling condenser 86 to the cathode of the gating diode 40. This gating diode is supplied with a controlling pulse derived from a conductor 88, which is of opposite polarity to that supplied by way of the conductor 81 and the resistor 82 to the gating diode 39. Consequently, the control pulse supplied through the conductor 88 is supplied through the other half of the gating multivibrator 42, and is obtainable therefrom by way of the conductor 89.

The third multivibrator, providing a one-line delay period, and which operates in a fashion similar to the multivibrators 29 and 30, is depicted at 28. In this connection, it may be noted that while all of the multivibrators 29, 30 and 28, shown in Fig. 6 as providing a 1½-line delay, a 2½-line delay and a 1-line delay respectively, are of similar character, with the operation in each instance being controlled by the same pulse series available at the input terminal 27. The characterizing difference in the various multivibrators resides in a choice of the time constants controlling these particular units. As illustration of suitable values to establish the operation, it may be assumed that each of the multivibrators 29, 30 and 28 utilizes a double triode tube type known as the 12AU7. The positive voltage source available at the conductor 75 may be assumed to be approximately 280 volts positive relative to ground. The positive voltage is applied to the left-hand half of each of the multivibrator tubes through the potentiometers 90, 91 and 93 respectively, each in series with resistor elements 94, 95 and 96, with the condensers 97, 98 and 99 being used to connect the plate of the right-hand half of the tube to the grid and the left-hand half of the tube. The time constants are so selected that the resistors 94, 95 and 96, for instance, may each be of a 100,000-ohm variety, with the potentiometers 90, 91 and 93 being of the 1-megohm, 2-megohm and 1-megohm size respectively, and the condensers 97, 98 and 99 respectively may be selected as being of a size of 500 micromicrofarads, 300 micromicrofarads and 300 micromicrofarads respectively, so that it can be appreciated wherein the different time delays are made possible.

In the diagrammatic showing of Fig. 5 it was pointed out also that the input signals available at the input terminal 27 and which are supplied by way of the conductor 78 are also supplied to the gating diode 31, with these signals being supplied to the cathode of this tube through a coupling condenser 101. The gating diode is opened and operated under the control of output pulses from the multivibrator tube 42, which pulses are of like polarity to those used to control the gating diode 39 and thus are represented by the pulses available in the conductor 81 and supplied to the cathode of the gating tube 31 by way of the cathode resistor 102. Consequently, during periods of coincidence of the negative pulse periods of the outputs from the multivibrator 42, as available from the right-hand half thereof in the conductor 81, and a like polarity of the incoming pulse at terminal 27, the time periods during which the diode 31 passes current are established.

From what has been pointed out above it is made evident that each of the gating diodes 38, 31 and 39 and 40 is operated with signal pulses from the source connected at terminal 27 in such fashion that this signal is supplied without delay on the gating diode 31, with the 1-line delay on the gating diode 38, with the 1½-line delay on the gating diode 39, and with a 2½-line delay on the gating diode 40. Control of the output pulses derived from the gating diodes 31, 38, 39 and 40 last above described has been illustrated as being established under the control of the multivibrator 42. This multivibrator tube 42 is controlled from a 60-cycle stepping pulse which is phased with the end of the equalizing pulses from the buffer amplifier in the pulse shaper unit in the standard sync signal generator for black-and-white television apparatus. This pulse source is applied at the terminal 35 and the signals are fed from this terminal through the coupling condenser 107 and the resistor 108 to the cathodes of the coupling diodes 36. This double diode 36 has its cathode elements maintained at positive voltage relative to the anodes thereof by connection through the resistor 108 to the conductor 76, whereupon the source of positive voltage is connected at 77. The diode anodes connect respectively to the anode elements of the two halves of the multivibrator 37, which serves as a gating multivibrator unit. The particular half of the multivibrator 37 which is drawing current will determine the potential of the anode elements of the double diode 36 forming the coupling diode between the source connected at terminal 35 and the gating multivibrator 37. The gating multivibrator 37 has each grid element thereof biased positively through connection through the indicated resistors and potentiometers to the positive voltage source on the terminal 76. Consequently, in accordance with which half of the multivibrator 37 is drawing current, one or the other halves of the double diode tube 36 is more positive than the other half. Consequently, if a negative pulse is applied at the terminal 35, that diode section on which the plate potential is highest with respect to ground will be the section first to draw current. Consequently, the potential at the plate thereof tends to be reduced, with a result that a pulse is applied to the grid of one or the other halves of the multivibrator 37 through either condenser 110 or condenser 111. The multivibrator 37 is thus triggered under the control of the pulse available at the terminal 35. This triggering operation causes a pulse to be transferred by way of the conductor 112 and the series resistors 113 and 114 to the cathode element of the gate 47, to which the combined output of the gating tubes 39 and 40 is also applied through the conductor 117. This control is represented on Fig. 5 as being effected by way of the conductor 50 connecting between the gate multivibrator 37 and the gate 47. Consequently, during periods of coincidence of the gated pulses of 1½-lines delay in the gate 39, or the gated pulses of 2½-lines delay in the gate 40 and the outputs from the multivibrator 42 the periods during which outputs from the gate tube 47 are available in the conductor 119 for supplying across the load resistor 120 and through the conductor 121 to the terminal point 51 are established. The gating multivibrator 53 can thus be energized or controlled through the switch 52 and the conductor 125. Gate 48 functions in a manner similar to gate 47, except that its operation is based on the zero and one-line delay periods as established by the outputs from gates 31 and 38 respectively.

The signals available at the output of the pulse forming multivibrator 53 are signals of the general form of the wave applied at the input terminal 27, but are shifted within a range of 2½ lines of a black-and-white picture in timing, so as to control the operation of the color sync pulse injector. Such signals are obtained across the output resistor 131 and fed by way of the coupling capacitor 132 and the decoupling and limiting resistor 133 to one of the grid electrode elements 134 of the gate mixer tube 54. There is concurrently supplied to the gate mixer tube a signal occurring at a frequency of 31.5 kc. (the equalizing pulse frequency from the pulse shaper), which signals are supplied by way of the conductor 135 to the control grid 137 of the same gate mixer tube 54. These signals as impressed upon the gate mixer tube 54 originate as pulses of a frequency of 31.5 kc. (the equalizing pulse frequency) and are available at the input terminal 58 and are fed through the decoupling resistor 139 and the coupling capacitor 140 to the amplifier 59 and thence across the output resistor 141 thereof and through the capacitor 142 and conductor 143 to the grid of the two-stage amplifier 57. These signals then, in amplified form as derived across the load resistor 147 of the right-hand half of the amplifier 57 are those signals which appear through the condenser 148 to be impressed upon the conductor 135 for mixing with the output of the pulse-forming multivibrator 53 in the gate mixer tube 54.

Output signals from the gate mixer tube 54 are then supplied by way of the conductor 151 so as to reach the vertical pulse delay multivibrator 55 (see Fig. 7) and the delay multivibrator 56 (also see Fig. 7).

It perhaps is well to point out at this time that all of the tubes 57, 53 and 54 shown in Fig. 6 serve an additional function of reshaping the applied signal pulses. This tends to stabilize all following stages because of the reshaped and reformed pulses.

At this point, reference may be made to the illustrative curves shown by Fig. 8, for the purpose of explaining slightly further the operation of that portion of the circuit diagram pictured by Fig. 5 and portrayed in one illustrative form by the circuit diagram of Fig. 6. In Fig. 8 curve ($a$) is a representation of the waveform available at the input terminal 27. This is a signal assumed to be in the form of pulses repeating at 60 pulses per second, with the pulses shifted with the start of vertical blanking and derived, as above noted, from the pulse former unit of a standard sync generator. In Fig. 8 the time relationship diagrammatically shown is purely illustrative and in no sense limiting nor necessarily intended accurately to portray the actual elapsed time. The curves thus must be considered purely illustrative of the operation.

In Fig. 8 all of the waves ($b$), ($c$) and ($d$) are schematically shown. The representation is the trailing edge only of a wave which actually commences coincidentally with the pulse ($a$). The forward edge of the wave is omitted for simplicity and since the rear edge describes the operation the positive section of the wave does not pass the gate.

The signal supplied and represented by waveform ($a$) when passed through the one-line delay multivibrator 28 is a pulse occurring in the general timing of curve ($b$). A similar condition occurs in the 1½-line delay multivibrator 29, and this may be represented by the waveform ($c$). Waveform ($d$) is a 2½-line delay signal, and is representative of the signal derived from the 2½-line delay multivibrator 30. The stepping pulse applied to the input terminal 35, as above noted, is phased with the end of the equalizing pulses and derived from the buffer amplifier in the pulse shaper unit of the sync signal generator. It also occurs at 60 cycles, and illustratively may be assumed diagrammatically as represented by the wave ($e$), although here again it must be emphasized that the timing of this pulse relative to the pulses ($a$) through ($d$) is used to show the actual operation sequence rather than to be considered as diagrammatic with respect to the precise time of happening. This pulse next, when applied to the gating multivibrator 37, may be considered to produce a signal from the left side output represented by the waveform ($f$), while the right side output can be considered, illustratively, as the waveform ($g$). As is indicated by the arrangements of Figs. 5 and 6, the output from the right half of the multivibrator 37 controls the gating multivibrator 42 through the coupling diode 43. Curves ($h$) and ($j$) represent the resultant waves appearing in the outputs of the left and right sides of the multivibrator 42 as available upon the conductors 81 and 89 respectively.

Illustratively, waveforms ($k$) and ($m$) represent the outputs at the gates 31 and 38 respectively. Waveforms ($l$) and ($n$) respectively represent the outputs at the gates 39 and 40 respectively. Waveforms ($p$) and ($r$) are the waveforms at the gates 48 and 47 respectively, while the combined output of the gates 47 and 48 supplied through conductors 125 to control the gate multivibrator 53 is that shown illustratively by the waveform ($s$) of Fig. 8. This accordingly, represents the sequence of events and shows the manner of controlling the timing of operation of the gate multivibrator 53.

Up until this point in the description, reference has been made to the stepping pulses made available at the input terminal 35. This reference was mainly for the sake of relating the circuit of Fig. 6 to the schematic illustration of Fig. 5. However, in practice, the terminal point 35 is actually an output terminal, in the pulse shaper unit.

The output of a stepping pulse amplifier tube 152, which is in the form of a double triode, is obtainable at terminal 35. Signal pulses are applied at the input terminal 153 and are derived from the conducting plate of a multivibrator (not shown) contained in the sync signal generator which sets the number of equalizing pulses in the pulse shaper unit. These signals are applied to the grid 154 of the left-hand section of the double triode. After amplification in this tube section the signals are fed by way of the condenser 155 to the grid 156 of the right-hand section. Output pulses from the right-hand tube section are then derived across the load resistor 157 and are available for application in the indicated manner at the terminal point 35.

The gate multivibrator 54 (see Fig. 6) as it delivers its output signal on the conductor 151 has that signal supplied along the conductor 151' of Fig. 7, so as to control and energize a pulse delay multivibrator 55 through the coupling capacitor 166. The operating parameters of multivibrator 55 are appropriately chosen to provide the desired delay and the output signals obtained therefrom are then supplied to the differentiating network comprising the condenser 168 (which also serves as a coupling condenser) and across the resistor 169 to one grid element 170, within a mixer tube 60. Concurrently, the mixer tube 60 is energized by the output on the amplifier-clipper 57 (see Fig. 6). This output signal is derived in Fig. 6 on the conductor 171 and is a signal of similar character to that obtained from the conductor 135 which supplies the gate mixed tube 54. The signal available on the conductor 171 of Fig. 6 is then supplied on the conductor 171' of Fig. 7 and is an amplified pulse occurring at a frequency of 31.5 kc. It is supplied to the control grid 173 of the gate mixer tube 60.

This gate mixer tube 60 is so arranged that it passes only signals of positive polarity. Such output signals as are developed are then applied across the tube load resistor 174 and through the coupling condenser 175 to control the multivibrator 61, which establishes the number of color sync pulses developed. The multivibrator output signals then feed through the coupling condenser 177 into the color mixer tube 183 so that this signal is applied to the control grid 185. A signal of 31.5 kc. vertical pulses derived from the standard pulse shaper of the black-and-white sync generator unit is supplied through the conductor 187 and coupling capacity 188 to a second grid 189 of this color pulse mixer tube 183 so that at the output pin 191 which connects to the plate of the vertical pulse mixer (not shown) of the standard sync generator for black-and-white operations these vertical pulses can be applied.

The output from the gate mixer tube 54 as available upon the conductor 151' is also applied through the coupling condenser 193 and the decoupling resistor 194 to the delay multivibrator 56. Color phase in this multivibrator may be established by the adjustment of the potentiometer 195 which connects at one end to the grid resistance 196, which, in turn, connects to the grid of one-half of the multivibrator and at the other end connects to the conductor 197, used to supply operating voltage to certain of the tubes. This positive voltage is derived from a connection of a suitable source not shown, at a terminal point 198, used to supply the conductor 199, and this conductor 197 through the connection 201.

The delay multivibrator 56 supplies its output signal through the discharge diode 70, which, in turn, connects both to the grid winding 203 of the iron core transformer 204 of the blocking oscillator discharge tube 71, later to be referred to more particularly, and also to capacitor 214 to discharge it at related time periods. The horizontal driving pulse available at the terminal point 67 is supplied through the conductor 207 to the amplifier 68 through the coupling condenser 208. This input signal is amplified in the tube 68 and the amplified pulse output is supplied through the storage and coupling condenser to the step charge diode 69 which serves as a step counter. The pulses supplied to the step counter diode 69 when fed through the condenser 209 reach the plate 210 of one half thereof, and the cathode 211 of the other half thereof.

The cathode 212 of the first half of the double diode step charge counter 69 has its terminal connected to one terminal of the storage condenser 214, of which the other terminal connects to ground. The combination of the double diode sections operates in well known fashion as a step counter. The condenser 209 is made considerably smaller than the condenser 214. Accordingly, the incoming pulses impressed from the output of the tube 68 serve to charge the condenser 209 during one half of the cycle. On the other half of the cycle the diode is caused to conduct and the result is that a charge is placed into the condenser 214. This operation occurs in repetition for each cycle of the incoming sync input wave appearing in the output of the amplifier 68. This continues until the charge on the condenser 214 is of such magnitude as to cause, when applied to the grid 217 of the blocking oscillator tube 71 by way of the transformer primary, a current to flow through this blocking oscillator. This current flow in the oscillator grid circuit discharges the condenser 214. The result is that a pulse is fed back from the plate to the grid and this is applied by way of a buffer amplifier 72 to control any suitable form of horizontal drive circuit (not shown) which may be connected, purely by way of example, at the output terminal point 218.

The signal for controlling this horizontal drive circuit is available across the output resistor 219 of the buffer amplifier.

The buffer amplifier serves, in this instance, to prevent reaction of the loading circuit upon the blocking oscillator 71. The discharge circuit controlled by the buffer amplifier output may be of any suitable form, it being understood, of course, that the function to be accomplished is that of providing a suitable control wave through the deflection coils to effect a sweep of the cathode ray scanning beam in the camera tube.

The discharge diode 70 then serves the function of discharging the charge on the condenser 214 and returning it to substantially zero value each time the diode conducts.

If the diode 70 is carried to a conducting state as a result of pulses being applied through the condenser 193 to the delay multivibrator 56 at a time other than immediately following the attainment of a charge in the condenser 214 which is of sufficient magnitude to cause the blocking oscillator tube 71 to trigger, it is apparent that the condenser 214 will be discharged without triggering the blocking oscillator. Therefore, the cycle of stepped charges in the condenser 214 again commences and the complete operation is recycled and rephased under the control of the conducting diode 70. This operation is closely parallel to that which will be described particularly in connection with the receiver operation for rephasing receiver operations so that they coincide with transmitter operations. The rephasing operation herein performed serves to set the relationship of one selected color to the pulses developed to establish color sync.

The foregoing explains generally the nature of the transmitter operation and the manner in which the group of six vertical sync pulses may be shifted with respect to each other. This will be apparent particularly from a consideration of the waveform of Fig. 4 and the curves of Fig. 8.

Reference may now be made to the receiver end of the system, wherein Fig. 9 is a block diagram to indicate a portion of a television receiver arranged to provide for triggering the horizontal or line sweep circuits and arranged also for incorporation with well-known and existing types of receiving instrumentalities.

In the usual form of television receiver the composite video and sync signals after being received are appropriately amplified and detected, and the sync signals are separated from the video signals. The video signals are used to control or modulate the intensity of the developed cathode ray beam. The separated sync signals are used to synchronize and control the deflection of the cathode ray beam in both the vertical or field direction and the horizontal or line direction.

The block diagram of Fig. 9 is illustrative of that portion of a television receiver wherein the separated sync signals which have been cleared of information of video character are impressed. Separated sync signals in such an arrangement are supplied at an input terminal 301, from which they are supplied to an integrating circuit 302 and thence to a suitable amplifier 303, after which they are fed through a diode coupler 304 and, for instance, a triggering multivibrator 305. The output of the triggering multivibrator feeds to a diode coupler 306 and also an amplifier 307. The diode coupler 306, in turn, controls the operation of a gate multivibrator 308 whose output feeds to a diode gate 309. Concurrently, the operation of multivibrator 305 supplies signals to control the amplifier 307 whose output drives a plurality of discharge diodes 310 connected across the integrating circuit 302 to wipe out the effect of any charges previously accumulated. Accordingly, during periods of conduction of the discharge diodes 310 the storage elements of the integrating circuit 302 are discharged and brought to an equilibrium value.

In many television receivers use is made of the so-called automatic frequency control type of line synchronization. Many receivers of this type are in use and are well known. One type of receiver incorporating such features is that known as the RCA Model 9 PC 41. In this arrangement wave energy is developed at a frequency corresponding substantially to the line repetition frequency of black-and-white image reproduction. These signals are compared in phase with incoming line frequency sync pulses in a phase discriminator tube. Phase shifts developed between these two characters of signal pulses vary the gain of a suitable reactance tube so as to, in turn, control the oscillator frequency and bring it into a stabilized state with respect to the incoming line frequency pulses. This oscillator usually develops the stabilized frequency between the grid, screen grid and cathode elements of a tetrode, and the resulting oscillation frequency is electron coupled to the plate of the tetrode. At the plate of the tetrode a wave having a somewhat squared characteristic is developed. A wave of this form is then applied to the input terminal 311 of Fig. 9 and supplied to a step charge diode counter 312 (which may be of a nature generally similar to the counter diode 69 of Fig. 7). A suitable blocking oscillator or other form of pulse generator 313 is driven under the control of the step charge diode 312. The diodes are in turn controlled in their operation by the output of the diode gate 309 where operation is controlled by the output of the amplifier 307.

The output from the blocking oscillator may then be supplied through a suitable buffer amplifier 314 to any appropriate form of line frequency deflection control circuit 315, whose output may be made available at an output terminal 316 to control the discharge tube of the usual line frequency deflection circuit of known character. Oscillations of the blocking oscillator may be damped by the usual form of diode damper such as that schematically represented at 317.

As illustration of a circuit suitable for operation in accordance with the schematic showing of Fig. 9, reference may now be made to Fig. 10, wherein the signal input from the sync separator circuit of the conventional television receiver may be assumed to be available at the terminal point 301 (in referring to Fig. 10 like general identification numbers to those appearing in Fig. 9 have been given wherever possible). The signals available at the input terminal point 301 and which illustratively may be assumed to have a waveform corresponding, for instance, to that portion of Fig. 4 shown above the line 325 will be supplied to the integrating circuit 302. The integrating circuit consists of a plurality of condenser elements 326 which connect at one terminal to ground and at the other terminal with the resistor elements 327 to form the usual integrating circuit or low pass filter. The integrating circuit then terminates across one of the condensers 326. It supplies the resultant output signal separating the integrated wave of the series of six long duration pulses to the amplifier tube 303. This amplifier in the showing of Fig. 10 comprises the left half of the double triode tube of which the right hand half illustratively is formed to provide the amplifier 309, later to be mentioned, which was described in connection with Fig. 9. The integrator or low pass filter 302 serves, as above noted, to integrate the long-duration vertical pulse signals and the resultant output signal, when amplified in the amplifier 303, is supplied across the output resistor 328 and through the conductor 329, the capacitor 330 and the limiting resistor 331, across a coupling diode 304. Output signals developed from the diode and representing an output of the amplifier 303 are then derived across a resistor 333 and supplied to control the operation of a triggered multivibrator 305 at one grid element 334 thereof. Output signals from this triggered multivibrator 305 are supplied by way of the conductor 337 and the condenser 338 to a coupling diode 306, as well as to the grid of the amplifier tube 307. The amplifier tube 307, as was above pointed out, operates to control the operation of a plurality of discharge diodes 310 which connect across the condenser elements of the integrating circuit 302. During periods when diodes 310 are conducting condensers 326 are discharged. Thus each time the diodes 310 are carried to a conducting state any charges which have previously been accumulated in the condensers 326 are carried to a zero value by discharge and the circuit is made responsive to long-duration signal pulses next to be received.

The coupling diode 306 is connected to control the operation of the gate multivibrator 308, which functions to draw out, as it were, the first pulse supplied. The multivibrator 308 is set to generate a pulse which is long as compared to the time spacing occurring between the vertical sync pulses and the color sync pulses received. The output of this multivibrator 308 which then becomes available at the terminal 341 is supplied through a plurality of integrating circuits comprising first the resistor 342 and the condenser 343 connected to one end thereof and thence through the resistor 344 and its shunt condenser 345 (this condenser also serves as a coupling condenser for supplying the output of the amplifier tube 309 to the counter 312, as will later be described). The integrated signals are supplied to control the diode gate tube 308 long with the signal output from the amplifier 307. The condenser element 345 forms both an integrating condenser for the signal output of the gate multivibrator 308 and a coupling condenser for controlling the operation of the gating diode 309 in accordance with the output of the amplifier 307.

As was explained in connection with the transmitter, particularly with respect to the description of Fig. 9, horizontal deflection is controlled in accordance with the charges built up in a step charge diode counter. The generally squared waveform pulses hereinabove assumed to be impressed at terminal 311 (see Fig. 9) are supplied by way of the condenser 357 (which serves as one storage element of the step charge counter) so as to charge this condenser. Connected to the condenser is a pair of diodes. These diodes are connected back-to-back so that the cathode of one diode and the anode of the other diode are connected to this condenser. The cathode of the diode whose anode connects to condenser 357 has a second condenser 358 connected between it and ground. The condenser 358 is large relative to condenser 357. It receives stepped charges in accordance with the current flow through the diode.

The charges build up during each cycle of receipt of the pulses at horizontal or line frequency available at the terminal 311. At time periods when a selected number of pulses have been accumulated, as charges in the condenser 358, the voltage effective at the grid 359 of the blocking oscillator tube 313 is sufficient to cause current to flow through the tube. This current finally builds up to a point where grid current flows to discharge condenser 358 through the oscillator tube. The flow of current through the oscillator tube is transferred from the plate winding 360 of the transformer 361 (a relatively high loss iron core transformer) to the grid winding 362, so that the tube 313 operates generally in well known manner according to blocking oscillator principles. However, as the arrangement has been disclosed, the oscillator 313 is of the monostable variety and is not free-running. It operates at time periods when the voltage available at the condenser 358 is of sufficient magnitude to cause current to flow through the tube.

Where the triggering operation in the blocking oscillator tube 313 occurs after a selected number of line frequency pulses available at the terminal 311 (in this instance, three pulses represent one line pulse for each of the three colors, red, green and blue), and where this operation is such that the triggering operation occurs in phase with the transmitter scanning, it is apparent that receiver operations will be correctly phased with respect to transmitter operations. In the event, however, that the receiver operation is not correctly phased with respect to the transmitter, and in the event that a line shift is to be introduced following the completion of any field of image representation, then a recycling operation under the control of the diode 309 occurs.

The diode 309, as above pointed out, has a voltage applied to it through the two integrating circuits comprising condensers 343 and 345, as well as the therewith-associated resistors 342 and 344, which voltage is determined by the operation of the gate multivibrator 308. Also, there is applied, as above pointed out, to the diode 309 a second control voltage which is established in accordance with the current flowing through the amplifier 307 as voltage is supplied through the conductor 348 and condenser 346, so that where a line shift is indicated as a result of the time spacing of the color sync pulses in varying timed relationship with respect to the vertical sync pulses, the diode 309 will conduct to discharge the condenser 358. If this discharge operation occurs at a time period prior to the time at which the voltage on condenser 358 builds up to a magnitude sufficient to trigger the multivibrator, it is apparent that signal pulses available at terminal 311 in excess of the normal number required for triggering the multivibrator will have to be applied through the diode counter 312 before the condenser voltage builds up to the proper amount. It consequently tends to lengthen the cycle of horizontal sweep to an extent such that a relative phase change between the normally effective vertical sync pulse and the line sync pulse is brought about. This relative phase change produces a change in the color line scanning and introduces color shift operating under the control of the color sync pulses which have been shifted as explained in connection with the transmitter operation.

In the control of the recycling operation of the blocking oscillator 313 under the control of the diode gate 309, the gate multivibrator 308 normally tends to operate in such a way that the right half of the tube is drawing current by reason of the connection of the grid electrode through the resistor element 339 to the source of positive plate voltage on conductor 340. This operation then tends to provide a cutoff state in the left-hand half of the multivibrator tube 308, with the result that the voltage effective at the point 341 is also that voltage available on the conductor 340. With the diode coupler 306 also connected so that its cathode element connects to the conductor 340 through the resistor 346, the diode 306 likewise normally is non-conducting.

In this state of operation the condensers 343 and 345 charge through the resistors 347 and 342 for the condenser 343, and also the resistor 344 for the condenser 345. By the connection shown and because of the charge on the condensers 343 and 345 reaching the tube cathode the gating diode 309 normally tends to remain in operation. This condition tends to be maintained until the diode coupler 306 is rendered conductive by reason of the pulse applied to the cathode thereof through the conductor 337 and the condenser 338. At this time current flowing through the diode 306 and drawn through the resistors 347 lowers the potential at the point 341 and this change in potential is made effective through the condenser 349 at the grid of the right-hand half of the gate multivibrator 308. This, in natural multivibrator fashion, causes current to be drawn by the left-hand half of the multivibrator so that the condensers 343 and 345 are discharged through the multivibrator and also the diode 306. The resulting multivibrator output pulse in turn causes current to flow through the diode gate 309. This diode gate 309 is connected across the storage condenser 358 of the pulse counter. It will accordingly discharge upon reaching a conducting state any charge stored in the condenser 358. The result is that during periods of any lack of phase coincidence between the diode operation and the operation of the blocking oscillator 313 to discharge condenser 358 there is what is in effect a lengthening of the time period between successive operations of the monostable blocking oscillator tube. This change period then is effective to shift the color line scanning by one or two color lines, depending upon the departure from phase coincidence. The change results in a recycling of the monostable oscillator and line color shift is readily obtainable.

The pulse output from the blocking oscillator is then applied through a suitable form of buffer amplifier 314 to control any suitable form of line deflection oscillator which will provide through appropriately and generally standard forms of deflection oscillator a suitably controlled operation of a discharge tube serving to control a line deflection output tube. Where desired, suitable damping for the oscillations of the blocking oscillator may be provided by well known diode means which has been conventionally indicated by Fig. 9. Various forms of line deflection oscillators may be provided, and therefore one of these forms has been schematically indicated by Fig. 9. It is, of course, to be understood that the deflection oscillator per se forms no part of this invention except insofar as it cooperates with the other elements hereinabove described.

For illustrative purposes, the invention has been described primarily with respect to the production of images originating side by side on the mosaic and target surface of a camera tube. It is, however, to be understood that the principles of invention are readily applicable also where three separate camera tubes, one for each color image, are utilized and appropriate switching is provided for selecting output signals following each scanning line, for instance, from one or the other of these different camera tubes. This switching may be accomplished by well known forms of electron switches which, per se, form no part of this invention. The principles of controlling the operation and providing the shift fully carry over to such type of arrangement. Similarly, at the receiver end of the system, illustratively, the invention herein described has been directed primarily to an image reproducing tube wherein the target area provided three side-by-side images in each selected color of the tricolor. These image areas were assumed to be scanned in sequence, so that first a line of red, followed by a line of green and then by a line of blue on the same general target area were traced. The sequence was then repeated. Shifting in the color cycle merely changed the point of commencement of the scanning operation. The principles herein proposed, however, carry over with equal force to any type of direct-view image-reproducing tube where, for instance, within a single area three different color-like images might result. This might be, for instance, by arranging phosphors of different characters adjacent each other in ruled formation and causing the scanning beam accurately to track these traces. It might also be provided by the formation of suitable target contour wherein a multiplicity of beams impacting the target form different directions, and might establish the color of light developed. Other forms of target might also be assumed which would produce light for each linear trace in different colors, depending upon a control of the target itself or of the scanning beam or of the direction from which the scanning beam impacts the target. The significant factor herein is that by taking recourse to the principles of shift operation herein described, the teachings of this disclosure with respect to color shift operations can readily be carried over to any and all types of polychrome image reproduction without in any way departing from either the spirit or the intended scope of what is herein set forth.

Further, the recycling operation is not necessarily restricted to line sequential methods. It is applicable to other forms of systems, that is, receivers or transmitters where changes in color order are brought about and the change or switching can be effective during blanking periods and by apparatus of the type herein defined and set forth.

By way of illustration, the invention herein has been described primarily in connection with the so-called single shift method of line sequential polychrome transmission and reception. It is, however, to be understood that the same principles herein disclosed are likewise applicable to use with the so-called double shift method. A double shift form of line sequential color television is described in various applications assigned to the present assignee company, and illustrative of one of these is application of George E. Sleeper, Jr., Serial No. 121,861. In the double shift method of line sequential color television it is, of course, apparent that each line of the image raster is analyzed in each color of the tricolor, so that in successive fields or frames the line color scanning order is so shifted as to bring about this form of analysis. Many forms of double shift patterns are available. The last-mentioned pending patent application disclosed certain forms.

A form of the double shift color pattern is also disclosed by the concurrently-filed application of the present inventors joined by C. F. Wolcott and entitled "Line Sequential Color Television Apparatus." The invention of the present application as utilized to provide the so-called double shift involves merely some modifications of the color sync control pulses insofar as the timing and positioning thereof with respect to the vertical sync pulses is concerned. Illustratively, the net effect is that to obtain the double shift it might be assumed that for the fifth and sixth fields scanned there would be a still further forward displacement relative to the second frame of the color sync signals by a one-line black-and-white period, or, alternatively, there could be a retardation of these color sync signals by a two-line black-and-white period, and still achieve the desired results. It therefore is to be understood that while single shift is mentioned as a specific illustration of the invention, the principles nonetheless carry over to the double shift space, as will be apparent to those skilled in the art to which the invention is directed.

Lastly, as an illustration of the functioning of the pulse wave formation developed during vertical or field blanking as herein described, it may be noted that instead of providing the single pulse cross prevalent in black-and-white operations where a group of six elongated vertical sync pulses are provided, the addition of the color sync pulses results in developing during the stated vertical blanking period of what might be termed a double pulse cross indication. Such indications are readily observable on oscilloscope apparatus, but since they occur during the blanking period they are not observable as a part of the viewed image raster coming within the visible window of the apparatus. They are useful to note, however, in making appropriate alignments of the color television receiver.

Having now described the invention, what is claimed is:

1. A cathode ray television receiver for producing either monochrome or polychrome image rasters comprising a deflection circuit to produce line deflection of the scanning cathode ray, a circuit to select each of synchronizing and phasing signal components from received composite television signals, a deflection control circuit connected to receive the selected incoming synchronizing signals and to be synchronized thereby, a counter circuit normally connected to receive the synchronizing signals and adapted to respond to a plurality of selected synchronizing signals for controlling the deflection circuit, said plurality of output signals coinciding with an integral number of component colors in the polychrome image, and a phasing circuit responsive to selected incoming phasing signals to recycle the counter following a plurality of deflections of the scanning ray under the control of the stable local source.

2. A television receiver for line sequential color shift reception wherein shifts between different component color scannings occur at substantially line repetition rate comprising a substantially stable local source for producing a recurring signal output at line scanning frequency, a signal selection circuit for deriving from received composite television signals both phase control and synchronizing components, a first control circuit connected to respond to the derived synchronizing signal components to stabilize the local source under the control thereof, a monostable scanning beam deflection circuit to produce line scanning synchronized under the control of the recurring line scanning frequency signal outputs, and a second control circuit connected to receive and respond to the derived phasing signal components for recycling the monostable circuit at substantially uniformly spaced time intervals each following a substantial multiplicity of operations of the local source of line scanning frequency outputs.

3. A cathode ray television receiver for reproducing either monochrome or polychrome image rasters comprising deflection circuits to produce each of line and field deflection of the scanning cathode ray, a circuit to select each of line and field synchronizing and, in addition, phasing color signals from incoming composite received television signals, means to control the field deflection from one of the selected signals, a substantially stable local source connected to be synchronized by the selected line frequency incoming synchronizing signals, a counter circuit connected to receive the output from the local source and adapted normally to respond to a plurality of output signals coinciding with the number of component colors in the polychrome image for controlling the line deflection circuit, and a phasing circuit connected to receive and respond to selected incoming phasing signals to recycle the counter following a plurality of deflections of the scanning ray under the control of the stable local source to shift the relative phase of the line deflection relative to the field deflection.

4. In a color television scanning circuit of the line sequential type employing a color cycle of $n$ image lines, a line sweep generator including a relaxation oscillator having one stable state and one non-stable state of operation, a scale-of-$m$ counter operative to generate a pulse and to recycle after receiving $m$ pulses, connections from said counter to said relaxation circuit to trip said oscillator from its stable to its non-stable state to initiate a cycle of said line-sweep generator, means for feeding line frequency pulses to said counter, and means actuated by phasing pulses at other than line frequency for recycling said counter after the receipt thereby of less than *m* counts.

5. A cathode ray type television receiver for line sequential color shift reception wherein in the scanning raster shifts between different component color scannings occur at substantially line repetition rate and following selected field deflections comprising a local source for producing recurring signals at substantially line scanning frequency, a signal selection circuit for deriving from received composite television signals both synchronizing and phasing components, a first control circuit connected to supply to the local source one of the derived synchronizing signal components for its stabilization, a monostable cathode ray scanning beam deflection control circuit to produce line scanning controlled by the recurring line scanning frequency signals, a field deflection control circuit to produce field scannings at a rate which is slow relative to the line deflection, a second control circuit connected to receive the derived phasing signal components and adapted for recycling the monostable circuit at substantially uniformly spaced time intervals each following a substantial multiplicity of operations of the local source of line scanning frequency signal outputs for shifting the relative position of the different color line scannings relative to the field deflection.

6. Television receiver apparatus for line sequential color shift reception comprising a substantially stable source for developing pulses at a frequency corresponding to the line deflection frequency, a signal selection circuit for deriving synchronizing and phasing signal components from incoming composite television signals, a circuit connected to receive the selected phasing signal components at its input and to produce output signals therefrom, a pulse developing circuit connected to receive the locally developed line frequency pulses and to respond to an integral number thereof, and a control circuit responsive to the signals produced from the phasing signal responsive circuit to restrict the time of development of the pulses under the control of the phase responsive circuit to one during a substantial multiplicity of the locally derived synchronizing signal components.

7. A receiver circuit for cathode ray television apparatus adapted to produce images in either polychrome or monochrome according to a line sequential pattern of color shift scanning comprising a pair of deflection circuits for deflecting the cathode ray beam bidirectionally to produce the line and field deflections thereof to develop the image, a circuit for selecting each of line and field synchronizing and color sync phase signals from a composite television signal, a circuit to initiate an operation of the line deflection circuit under the control of received line synchronizing pulses, a circuit to initiate an operation of the field deflection circuit under the control of the field synchronizing signals, and a control circuit responsive to the selected color phase signals for recycling the line deflection control circuit relative to the field deflection control to maintain color phase and to shift color phase relative to the line scanning traces.

8. Cathode ray television receiver apparatus for each of monochrome and polychrome line-sequential color shift reception comprising a signal selection circuit for deriving both line and field synchronizing and color phasing signal components from incoming composite television signals, a deflection circuit for deflecting the scanning beam in a field deflection pattern at a timing rate coinciding with the receipt and selection of field frequency pulses, a circuit for receiving the selected phasing signal components and adapted to respond thereto for producing signals indicative of line color phase, a deflection control circuit for deflecting the beam in a line pattern said circuit being supplied with line frequency pulses at its input and adapted to respond to an integral number thereof, a cathode ray beam deflection control circuit to initiate a line deflection scanning of the cathode ray beam substantially coincidentally with the said integral number of line frequency pulses, a control circuit connected to receive the output of the phase selection circuit and adapted to recycle the line deflection circuit under the control thereof once following a substantial number of line frequency pulses which remains constant so that the relative position of selected color line traces in the image raster shifts at a field deflection rate.

9. Cathode ray television receiver apparatus for each of monochrome and polychrome line-sequential color shift reception comprising a signal selection circuit for deriving line and field synchronizing pulses and color phasing signal components from incoming composite television signals, comprising a first deflection circuit for deflecting the scanning cathode ray beam in a field deflection pattern at a timing rate coinciding with the receipt and selection of field frequency synchronizing pulses, a second deflection circuit for deflecting the scanning cathode ray beam in a line pattern for recreating the lines of an image, a color phase signal producing circuit connected to receive the selected color phasing signal components for producing output signals indicative of the color phase of the recreated lines, a line deflection control circuit to initiate an operation of the line deflection circuit following the receipt of an integral number of line frequency synchronizing signal pulses, and a control circuit responsive to the output of the color phase signal selecting circuit to recycle the line deflection circuit once following the receipt of selected field synchronizing impulses so that the relative position of selected color line traces in the image shifts at a field deflection rate.

10. Cathode ray television receiver apparatus for each of monochrome and polychrome line-sequential color shift reception comprising a signal selection circuit for deriving line and field synchronizing pulses and color phasing signal components from incoming composite television signals, a first deflection circuit for deflecting the scanning cathode ray beam in a field deflection pattern at a timing rate coinciding with the receipt and selection of field frequency synchronizing pulses, a second deflection circuit for deflecting the scanning cathode ray beam in a line pattern for recreating the lines of a traced raster, a circuit for producing output signals indicative of the color phase of the raster lines connected to the selection circuit and adapted to respond to the selected color sync phasing signal components, a counter circuit adapted to respond to received line synchronizing pulses and normally to initiate an operation of the line deflection circuit following the receipt of an integral number of line frequency signal pulses, and a control circuit connected to receive the color sync phasing signals and adapted to recycle the counter circuit intermediate its maximum and minimum counts following the receipt of selected field synchronizing impulses to delay the normal initiation of line deflection for a time period such that the relative position of selected color line traces in the traced raster may be shifted at a field deflection rate.

11. In a color television system of the line-sequential type employing a color cycle of *n* lines wherein composite video, synchronizing and color phasing signals are transmitted, a receiver for such signals comprising a cathode ray tube having a display screen divided into separate portions which when energized are visible respectively in *n* different primary colors and means for generating cathode rays and scanning a beam thereof over each portion of said screen, means for detecting said composite signals, means for separating line-synchronizing signals therefrom a scale-of-*m* counter fed by said separating means and operative normally to recycle after each *m* counts and to generate a characteristic output voltage upon each normal recycling, means adapted to respond to said characteristic voltage for directing the cathode ray beam to a portion of said display screen visible in a specific color chosen to initiate said color cycle, means for selecting phasing signals from said composite signals, and means connected to respond to said phasing signals for recycling said counter irrespective of the number of counts registered thereby since last recycled by said line synchronizing pulses and to confine the characteristic voltage generation to time periods coinciding with $m$ counts following the last previous recycling.

12. In a television receiver for monochrome and polychrome pictures of the line-sequential type operating on a color cycle of an integral number of lines, a signal selecting circuit for separating videosignals, line and frame synchronizing signals and color phasing signals used for phase determination, a scaling circuit connected to receive the line synchronizing pulses and under the control thereof to generate a pulse upon receiving an integral number of signals after any recycling and to recycle upon the generation of such a pulse, means controlled by said phasing signal for recycling said scaling circuit independently of said pulse generation, a generator of scanning waves of field frequency and a generator of scanning waves of line frequency, one of said generators including a pulse generator having a normally stable state and an unstable state of short duration with respect to the period of the scanning waves generated by said one generator, and connections from said scaling circuit to apply the pulses generated thereby to said pulse generator to trip said pulse generator from its stable to its unstable state.

13. In a color television receiver in a system of the line sequential type employing a color cycle repeating in $n$ image lines, means for receiving and detecting composite signals including video, line and field synchronizing and color phasing components, means for separating said line synchronizing components from said composite signals, a scale-of-$m$ counter, means for energizing said scale-of-$m$ counter from said separating means, said counter being normally operative to generate a pulse and to recycle after each $m$ counts, means actuated by said pulse for selecting the color wherein the next succeeding line is scanned, means for separating said phasing components from said composite signals and means for recycling said counter by said phasing components irrespective of the number of line-frequency synchronizing components registered by said counter when so recycled and confining the pulse generation to those periods corresponding to normal recycling.

14. Television receiver apparatus for line-sequential color shift reception comprising a substantially stable source for developing pulses at a frequency corresponding to the line deflection frequency, a signal selection circuit for deriving synchronizing and phasing signal components from incoming composite television signals, a counter circuit connected to respond to selected phasing signals, a pulse counter circuit connected to respond to the locally developed line frequency pulses, a monostable scanning beam deflection control circuit connected to respond to the counter circuit at time periods when the energy of an integral number of pulses exceeds a selected bias value, and a control circuit operating under the control of the first named control circuit to delay the control of the monostable oscillator from the said control circuit to prevent interaction between the synchronizing and phasing operations.

15. In a color television scanning device of the line-sequential type employing a color cycle of $n$ image lines, a line-sweep generator including a relaxation oscillator having one stable state and one non-stable state, a scale-of-$m$ counter operative normally to recycle after receiving $m$ pulses, connections from said counter to said relaxation oscillator to trip said oscillator from its stable to its non-stable state at the time of normal counter recycling to initiate a cycle of said line-sweep generator, means for feeding line frequency pulses to said counter and means actuated by said phasing pulses at other than line frequency for recycling said counter after the receipt thereby of less than $m$ counts thereby to delay the normal recycling and oscillator control therefrom to establish color shift.

16. In a color television system of the line-sequential type employing a color cycle repeating after each $n$ lines of image tracing wherein composite video, synchronizing and phasing signals are transmitted, a receiver wherein such signals are recreated as electro-optical images upon the display target of a cathode ray tube divided into separate portions which when energized are visible in $n$ different primary colors and the intensity of the image is modulated under the control of the video signals as the beam moves over each portion of said target, comprising, means for detecting said composite signals, means for separating line-synchronizing signals from the composite signals, a scale-of-$m$ counter connected to said separating means and normally operative to recycle after each $m$ counts and to generate a characteristic output voltage at the time of each normal recycling, means for directing the cathode ray beam to a portion of said display target under the control of said characteristic voltage in a specific color chosen to initiate said color cycle, means for selecting phasing signals from said composite signals, and means controlled by said phasing signals for recycling said counter irrespective of the number of counts registered thereby since last normally recycled by said line synchronizing pulses.

17. In line sequential television apparatus, means for producing all of line frequency pulses, equalizing pulses, vertical synchronizing pulses and color phasing pulses during each field scanning of the polychrome image wherein each line of the image is scanned in a different color of a repeating color cycle, means to develop blanking pulses following each field scanning operation and during the period of development of all of the several types of signal pulses named, and means for varying the timing of the color phasing pulses relative to the vertical synchronizing pulses for providing for shifting the color order in which the image lines are scanned at receiving points.

18. In the sequential color television apparatus wherein an image is scanned in a line sequential pattern in which successive lines are scanned in different cyclically repeating colors of a multi-color additive system, means for developing line synchronizing pulses indicative of the time of commencement of each line of scanning, means for developing blanking pulses indicative of the time of completion of each scanned field and intervening between that scanning and the next succeeding field scanning, means for developing equalizing signal pulses, field synchronizing pulses, color phasing pulses and line synchronizing pulses during the period of blanking, said pulses being developed in an order such that a selected number of equalizing pulses follow the initiation of the blanking period with the field synchronizing pulses next following and succeeded by further equalizing pulses with an additional pulse series comprising color phasing pulses commencing as a group during the period of the last-named equalizing pulses and continuing for a portion of the last-named equalizing pulse period which equailzing pulses are then followed by line sync pulses during the remainder of the blanking period, means for shifting the timing of the color phasing pulses relative to the field synchronizing pulses following the completion of selected field scannings, whereby at receiver points shifts in the color scannings of the image traces are initiated.

19. Color television apparatus of the line sequential type wherein the linear traces of successive rasters are representative of different component colors of a multi-color comprising means to develop line frequency synchronizing pulses indicative of the time of commencement of each scanning line, means for developing blanking pulses indicative of the time intervening between the completion of scanning of one field and the commencement of scanning of the next succeeding field, means for developing $m$ equalizing pulses at the commencement of the blanking period, means for developing $m$ field synchronizing pulses immediately following the said equalizing pulses, means for developing a first group of additional equalizing pulses immediately following the field sync pulses, means for developing $m$ color sync phasing pulses following the last-named group of equalizing pulses, means for developing a second additional group of equalizing pulses following the color phasing pulses, the total number of equalizing pulses in the first and second additional groups being a constant with the separate groups separated by the color phasing pulses, means for developing line frequency synchronizing pulses in the remaining portion of the blanking period, and means for shifting the group of color phasing pulses relative to the two additional groups of equalizing pulses so that the number of equalizing pulses separating the color phasing and the field synchronizing pulses varies following selected fields of scanning while maintaining the total number of equalizing pulses in the two last named groups of additional equalizing pulses constant whereby under the control of the time shifted color phasing pulses color shift in the line scanning color of the successively produced rasters is initiated while maintaining the color scanning cycle.

20. In a color television system of the line sequential type employing a color cycle repeating in $n$ lines and wherein composite video, synchronizing and color phasing signals are transmitted, a receiver for such signals comprising a cathode ray tube having display screen divided into separate portions which when energized are visible respectively in $n$ different primary colors, means for generating cathode rays and scanning a beam thereof over each portion of said screen, means for detecting said composite signals, means for separating line-synchronizing signals and field synchronizing signals therefrom, a scale-of-$m$ counter fed by said separating means and operative to recycle after each $m$ counts and generate a characteristic output voltage upon each such recycling, means responsive to said characteristic voltage for directing the cathode ray beam to a portion of said display screen visible in a specific color chosen to initiate said color cycle, means for selecting color phasing signals from said composite signals, and means responsive to said color phasing signals for recycling said counter irrespective of the number of counts registered thereby since last recycled by said line synchronizing pulses.

References Cited in the file of this patent

UNITED STATES PATENTS

| | | |
|---|---|---|
| 2,296,908 | Crosby | Sept. 29, 1942 |
| 2,378,746 | Beers | June 19, 1945 |
| 2,389,646 | Sleeper | Nov. 27, 1945 |
| 2,399,421 | Artzt | Apr. 30, 1946 |
| 2,515,613 | Schoenfeld | July 18, 1950 |
| 2,547,598 | Roschke | Apr. 3, 1951 |